US009621622B2

(12) United States Patent
Ueda et al.

(10) Patent No.: US 9,621,622 B2
(45) Date of Patent: Apr. 11, 2017

(54) INFORMATION PROVIDING APPARATUS, INFORMATION PROVIDING METHOD, AND NETWORK SYSTEM

(71) Applicant: YAHOO JAPAN CORPORATION, Tokyo (JP)

(72) Inventors: Yuji Ueda, Tokyo (JP); Yusuke Fujiki, Tokyo (JP); Hideki Eguchi, Tokyo (JP); Yusuke Kondo, Tokyo (JP); Kenichirou Yamaguchi, Tokyo (JP); Mariko Fujita, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 232 days.

(21) Appl. No.: 13/961,128

(22) Filed: Aug. 7, 2013

(65) Prior Publication Data
US 2014/0173031 A1 Jun. 19, 2014

(30) Foreign Application Priority Data

Dec. 18, 2012 (JP) ................................. 2012-276036

(51) Int. Cl.
*H04L 29/08* (2006.01)
*G06F 17/30* (2006.01)
(Continued)

(52) U.S. Cl.
CPC ........ *H04L 67/02* (2013.01); *G06F 17/30873* (2013.01); *G06Q 30/0241* (2013.01); *G06Q 50/01* (2013.01); *H04L 67/1095* (2013.01)

(58) Field of Classification Search
CPC ....... H04L 67/306; H04L 67/02; H04L 51/00; H04L 41/00; H04L 43/00; H04L 61/00;
(Continued)

(56) References Cited

U.S. PATENT DOCUMENTS 8,332,767 B1* 12/2012 Beil ....................... G06Q 50/01
715/230
8,495,489 B1* 7/2013 Everingham .......... G06Q 30/02
707/621
(Continued)

FOREIGN PATENT DOCUMENTS

JP    A-2002-133265      5/2002
JP    2006-099722 A      4/2006
(Continued)

OTHER PUBLICATIONS

Office Action issued in Japanese Patent Application No. 2012-276036 dated Jan. 30, 2014 (with translation).
(Continued)

*Primary Examiner* — Wing F Chan
*Assistant Examiner* — Billy H Ng
(74) *Attorney, Agent, or Firm* — Oliff PLC

(57) ABSTRACT

An information providing apparatus according to an embodiment of the invention includes a receiving unit and a distribution unit. The receiving unit receives an access request for accessing first content from a terminal apparatus used by a first user. The distribution unit distributes, to the terminal apparatus, the first content including link information which is posted by a second user related to the first user in a predetermined communication service among pieces of link information to other content when the receiving unit receives the access request.

20 Claims, 14 Drawing Sheets

(51) Int. Cl.
*G06Q 30/02* (2012.01)
*G06Q 50/00* (2012.01)

(58) Field of Classification Search
CPC ......... H04L 65/00; H04L 67/00; H04L 69/00; H04L 67/1095; G06F 17/30873; G06Q 30/02
See application file for complete search history.

(56) References Cited

U.S. PATENT DOCUMENTS

| | | | |
|---|---|---|---|
| 2003/0200268 A1* | 10/2003 | Morris | G06Q 90/00 709/206 |
| 2006/0218577 A1* | 9/2006 | Goodman | G06Q 30/02 725/32 |
| 2009/0119167 A1* | 5/2009 | Kendall | G06Q 30/02 705/14.17 |
| 2009/0131177 A1* | 5/2009 | Pearce | A63F 13/10 463/43 |
| 2009/0316864 A1* | 12/2009 | Fitzsimmons | G06Q 10/10 379/88.13 |
| 2010/0010822 A1* | 1/2010 | Bal | G06Q 30/02 705/1.1 |
| 2010/0257023 A1 | 10/2010 | Kendall et al. | |
| 2010/0332330 A1* | 12/2010 | Goel et al. | 705/14.66 |
| 2012/0084160 A1* | 4/2012 | Badros et al. | 705/14.73 |
| 2013/0317909 A1 | 11/2013 | Iwabuchi et al. | |

FOREIGN PATENT DOCUMENTS

| | | | |
|---|---|---|---|
| JP | 2012-093806 A | 5/2012 | |
| JP | 2012-16400 * | 8/2012 | ............ G06F 17/30 |
| JP | A-2012-164000 | 8/2012 | |
| JP | 2012-190059 A | 10/2012 | |
| JP | 2012-203587 A | 10/2012 | |
| JP | A-2012-523613 | 10/2012 | |
| JP | A-2012-242976 | 12/2012 | |
| WO | 2011/133403 A1 | 10/2011 | |

OTHER PUBLICATIONS

May 26, 2015 Office Action issued in Japanese Patent Application No. 2014-115878.
Sep. 13, 2016 Office Action issued in Japanese Patent Application No. 2015-185550.

\* cited by examiner

FIG.4
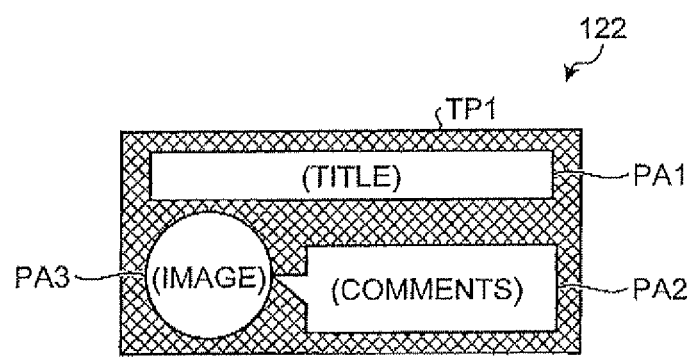
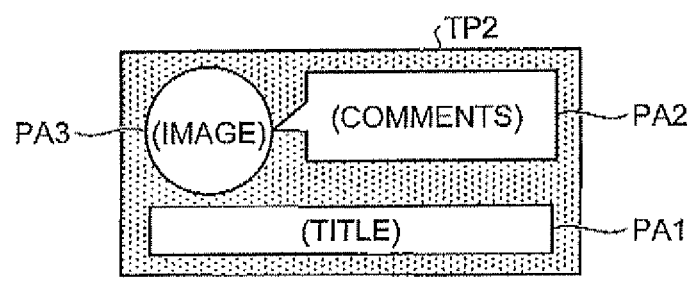
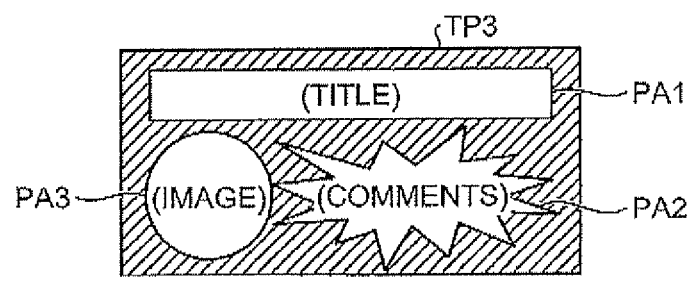

| SNS-SIDE USER ID | PASSWORD | FRIEND ID |
|---|---|---|
| U1 | P21 | U2, U3 |
| U2 | P22 | U1 |
| U3 | P23 | U1 |
| ... | ... | ... |

| SNS-SIDE USER ID | TAGGED IMAGE | TAG AREA |
|---|---|---|
| U1 | G11.gif | R11 |
| | G12.gif | R12 |
| | G13.gif | R13 |
| | ... | ... |
| ... | ... | ... |

| SNS-SIDE USER ID | SHARE PANEL |
|---|---|
| U1 | PN10.gif |
| | PN20.gif |
| | PN30.gif |
| | ... |
| ... | ... |

223

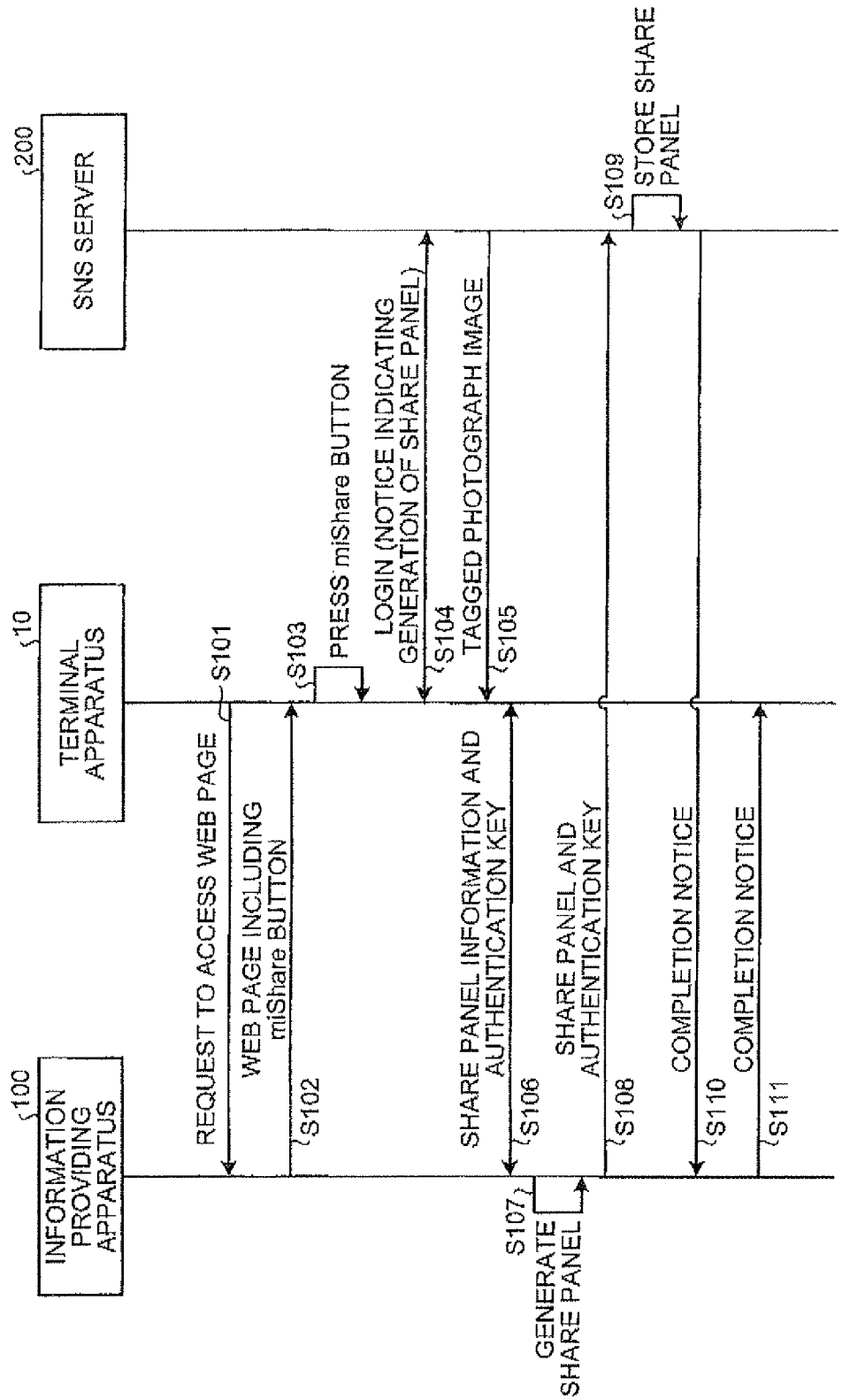

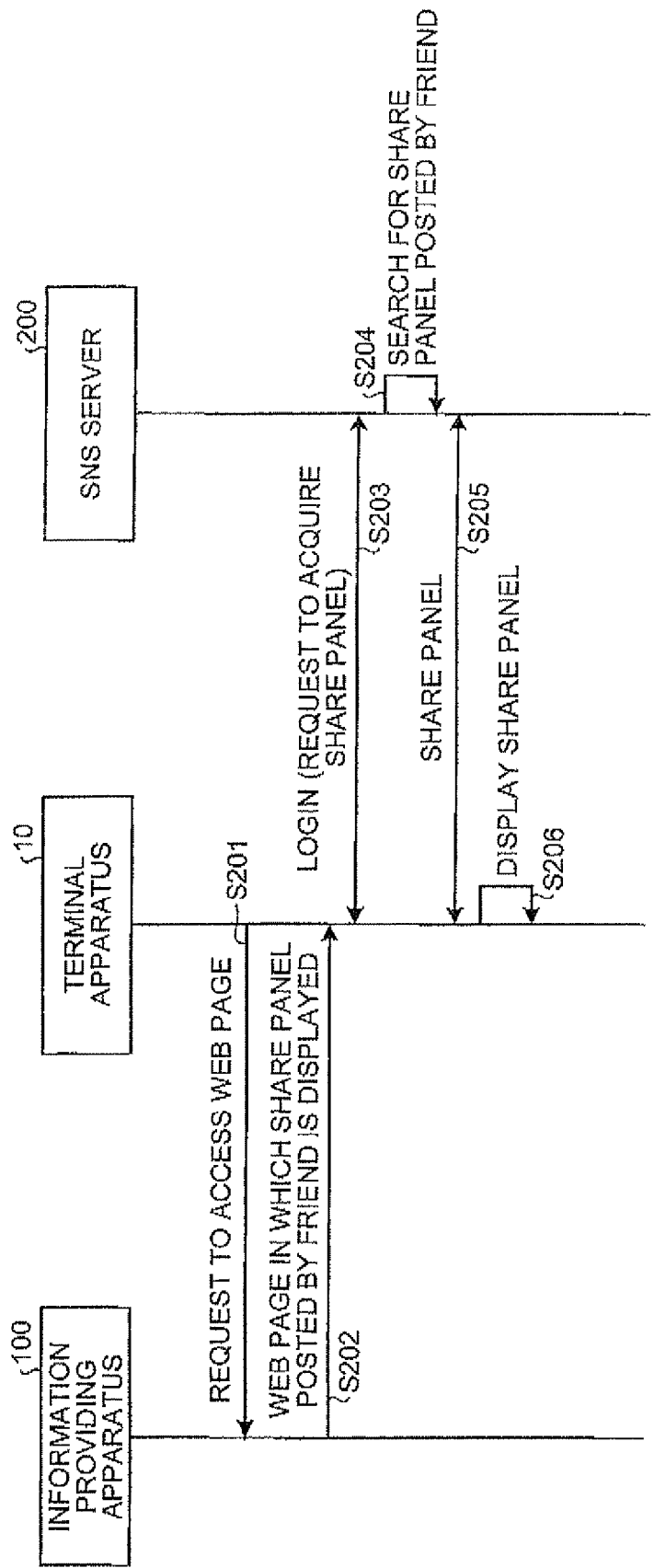

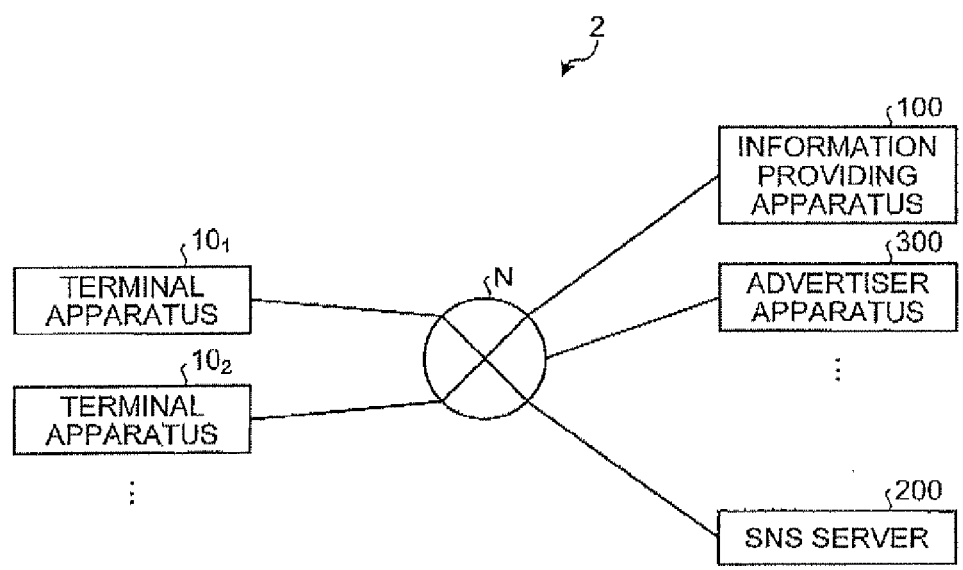

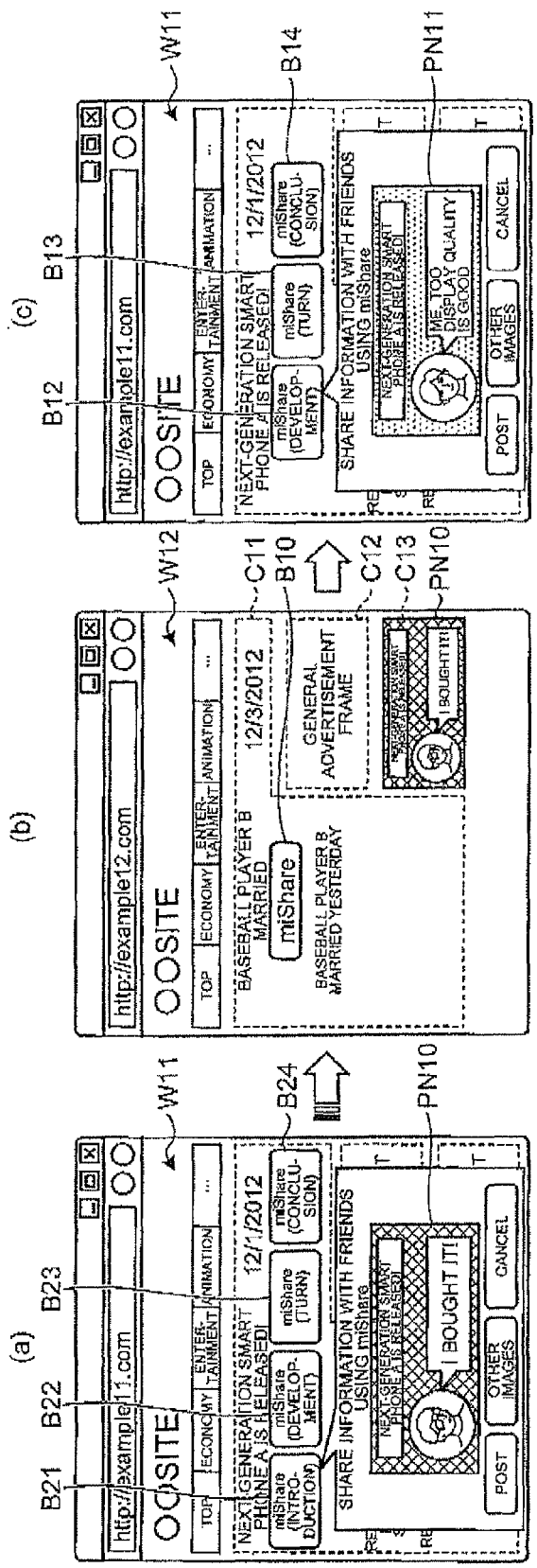

INFORMATION PROVIDING APPARATUS, INFORMATION PROVIDING METHOD, AND NETWORK SYSTEM

CROSS-REFERENCE TO RELATED APPLICATIONS

The present application claims priority to and incorporates by reference the entire contents of Japanese Patent Application No. 2012-276036 filed in Japan on Dec. 18, 2012.

BACKGROUND OF THE INVENTION

1. Field of the Invention

The present invention relates to an information providing apparatus, an information providing method, and a network system.

2. Description of the Related Art

In recent years, with the rapid spread of the Internet, advertisements have been actively distributed through the Internet. For example, advertising content for advertising, for example, a company or a product is displayed at a predetermined position of a web page. When the advertising content is clicked, advertisement distribution which changes the page to the web page of an advertiser is performed.

As a technique related to the advertisement distribution, a technique called targeting distribution has been known which selects advertisements to be distributed on the basis of the relation between the profile information of a user and target information (for example, an age group and sex) linked to advertisements by the advertiser (for example, see Japanese National Publication of International Patent Application No. 2012-523613). In addition, as advertisement distribution using a social networking service (SNS), a technique called sponsored advertisement has been known in which the user associates (tags) the user with the SNS page (hereinafter, referred to as a "company page") of a company or a product to open the advertising content of the company page to friends. According to these techniques, it is considered that the advertising effect can be improved.

However, in the techniques according to the related art, advertisements with high customer appeal are not necessarily distributed. Specifically, in the technique related to the sponsored advertisement, in many cases, the advertising content of the company page is different from the content of the page posted by the user associated with the company page. Therefore, in many cases, the user who has browsed the advertising content of the company page does not click the advertising content to visit the advertiser site. For this reason, in the advertisement distribution technique according to the related art, advertisements with high customer appeal are not necessarily distributed.

SUMMARY OF THE INVENTION

According to one aspect of an embodiment, an information providing apparatus includes a receiving unit that receives an access request for accessing first content from a terminal apparatus used by a first user and a distribution unit that distributes, to the terminal apparatus, the first content including link information which is posted by a second user related to the first user in a predetermined communication service among pieces of link information to other content when the receiving unit receives the access request.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a template storage unit according to the embodiment;

FIG. 8 is a diagram illustrating an example of an image storage unit according to the embodiment;

FIG. 9 is a diagram illustrating an example of a share panel storage unit according to the embodiment;

FIG. 10 is a sequence diagram illustrating the procedure of a share panel posting process in the network system according to the embodiment;

FIG. 11 is a sequence diagram illustrating the procedure of a share panel display process in the network system according to the embodiment;

FIG. 12 is a diagram illustrating an example of the structure of a network system according to a modification;

FIG. 13 is a diagram illustrating an example of a template storage unit according to the modification;

FIG. 17 is a diagram illustrating an example of the display of a plurality of share panels according to the embodiment.

DETAILED DESCRIPTION OF THE PREFERRED EMBODIMENTS

Figure 1:
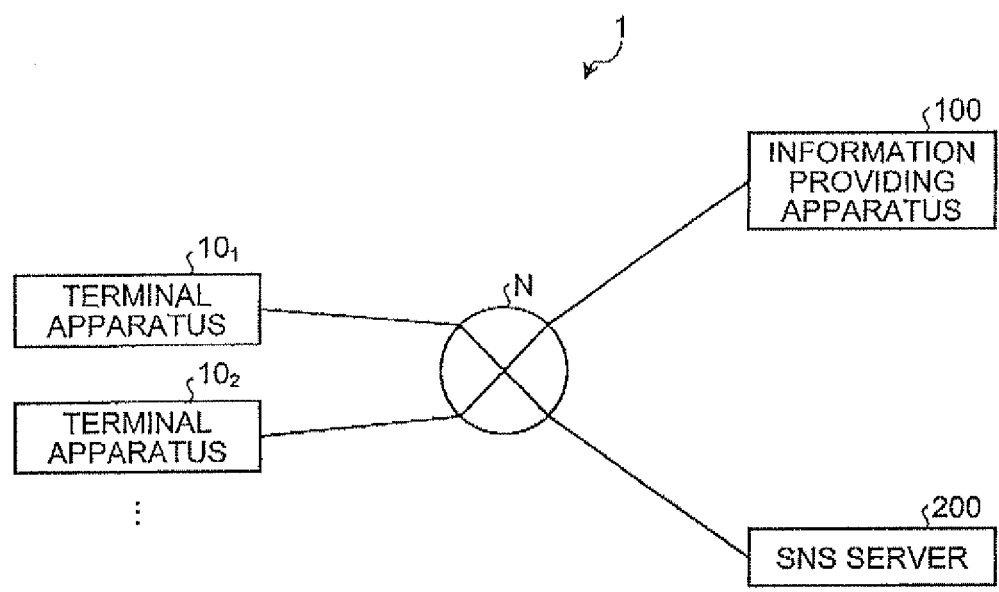
FIG. 1 is a diagram illustrating an example of the structure of a network system according to an embodiment.

Hereinafter, an information providing apparatus, an information providing method, an information providing program, and a network system according to exemplary embodiments (hereinafter, referred to as "embodiments") of the application will be described in detail with reference to the accompanying drawings. The information providing apparatus, the information providing method, the information providing program, and the network system according to the invention are not limited by the embodiments. In the following embodiments, the same components are denoted by the same reference numerals and the description thereof will not be repeated.

1. Structure of Network System

First, the structure of a network system 1 according to an embodiment will be described with reference to FIG. 1. As illustrated in FIG. 1, the network system 1 according to the embodiment includes terminal apparatuses $10_1$ and $10_2$, an information providing apparatus 100, and an SNS server 200. The terminal apparatuses $10_1$ and $10_2$, the information providing apparatus 100, and the SNS server 200 are connected to a network N by wire or wirelessly. In FIG. 1, the network system 1 includes two terminal apparatuses $10_1$ and $10_2$, one information providing apparatus 100, and one SNS server 200. However, the network system 1 may include three or more terminal apparatuses, a plurality of information providing apparatuses 100, or a plurality of SNS servers 200.

The terminal apparatuses $10_1$ and $10_2$ are information processing apparatuses used by the users and are, for example, portable terminals, such as desktop personal computers (PCs), tablet PCs, notebook PCs, smart phones, or personal digital assistants (PDAs). The terminal apparatuses $10_1$ and $10_2$ according to the embodiment include, for example, a browser and have a function of displaying web pages. The terminal apparatuses $10_1$ and $10_2$ have the same functions. In the following description, in some cases, when the terminal apparatuses $10_1$ and $10_2$ do not need to be distinguished from each other, they are generically referred to as a "terminal apparatus 10".

The information providing apparatus 100 is a server apparatus which provides various kinds of web pages to the terminal apparatus 10. For example, the information providing apparatus 100 distributes the web pages of a news site, a finance site (stock price site), a weather site, a shopping site, a search engine site, and a net auction site.

The SNS server 200 is a service providing apparatus which provides a social networking service as an example of a communication service. For example, the SNS server 200 manages the relationship (for example, friendship) between the member users on the Internet as a social network and provides a service which opens, for example, article pages or images posted by the member users to other users belonging to the social network. The services provided by the SNS server 200 correspond to, for example, Facebook (registered trademark), Twitter (registered trademark), and Mixi (registered trademark).

In the network system 1 illustrated in FIG. 1, the information providing apparatus 100 generates link information to the web page distributed to the terminal apparatus $10_1$ and transmits the generated link information to the SNS server 200, in response to the operation of the user of the terminal apparatus $10_1$. Then, the user of the terminal apparatus $10_1$ can post link information to the web page to the SNS server 200. When an access request is received from the terminal apparatus $10_2$, the information providing apparatus 100 distributes the web page in which the link information posted by the user who is a friend of the user of the terminal apparatus $10_2$ is displayed to the terminal apparatus $10_2$ in the social networking service provided by the SNS server 200. For example, when the user of the terminal apparatus $10_1$ and the user of the terminal apparatus $10_2$ are friends, the information providing apparatus 100 distributes the web page in which the link information posted by the user of the terminal apparatus $10_1$ is displayed to the terminal apparatus $10_2$. Next, a process performed by the information providing apparatus 100 will be described with reference to FIG. 2. In the following embodiments, an example in which a link image (hereinafter, referred to as a "share panel") linked to the web page is generated as the link information to the web page will be described.

2. Information Providing Process

Figure 2:
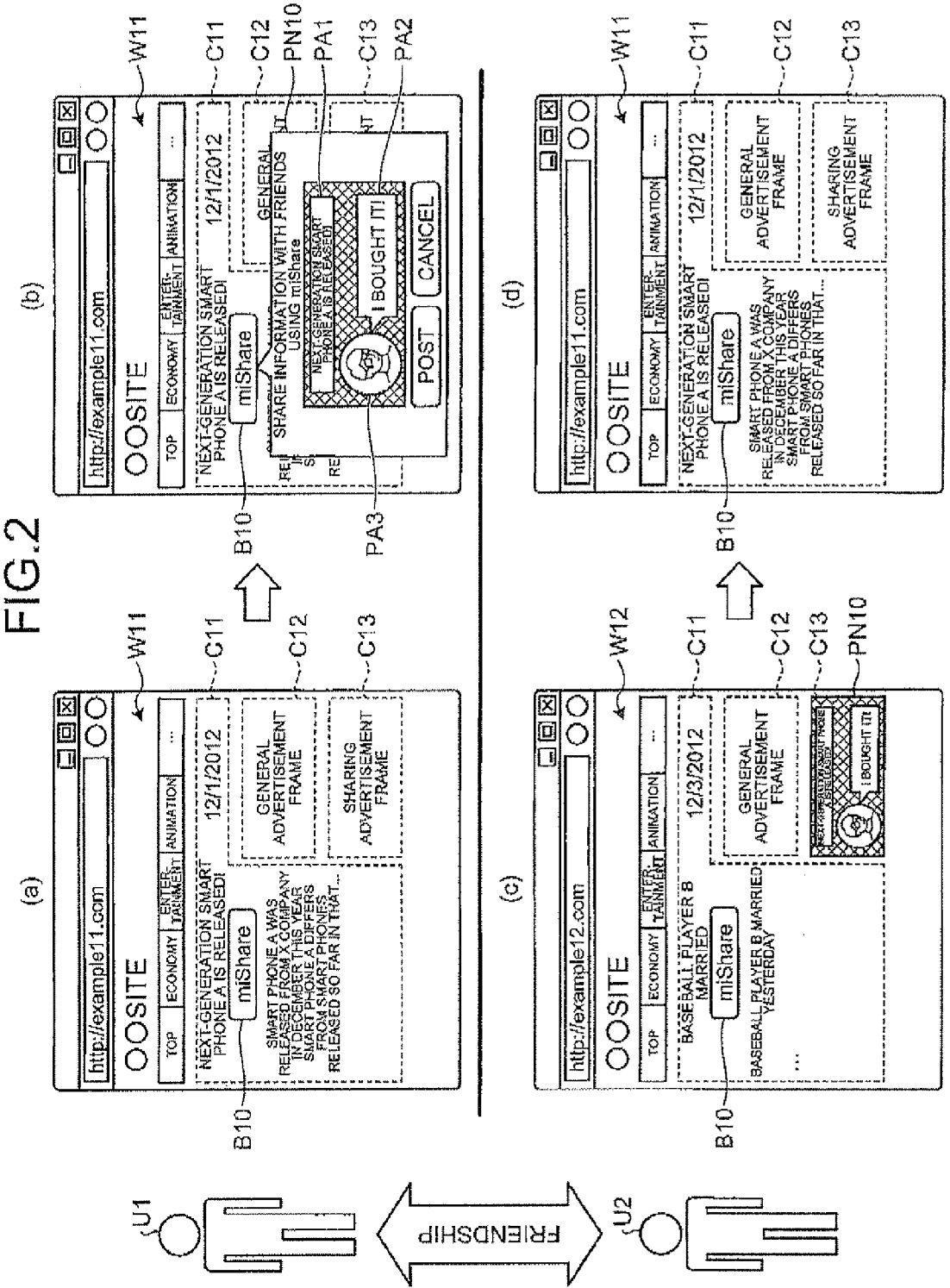
FIG. 2 is a diagram illustrating an example of an information providing process performed by an information providing apparatus according to the embodiment.

FIG. 2 is a diagram illustrating an example of an information providing process performed by the information providing apparatus 100 according to the embodiment. In the example illustrated in FIG. 2, it is assumed that the terminal apparatus $10_1$ illustrated in FIG. 1 is used by a user U1 and the terminal apparatus $10_2$ is used by a user U2. In addition, it is assumed that the user U1 and the user U2 are friends belonging to the same social network in the social networking service which is provided by the SNS server 200.

First, as illustrated in FIG. 2(a), the user U1 operates the terminal apparatus $10_1$ to transmit an access request to the information providing apparatus 100 and the terminal apparatus $10_1$ displays a web page W11 distributed from the information providing apparatus 100 on, for example, the browser. The web page W11 illustrated in FIG. 2(a) includes an article display frame C11, a general advertisement frame C12, and a sharing advertisement frame C13.

The article display frame C11 is an area in which news articles are displayed. In this example, an article with a title "the next-generation smart phone A is released!" which is posted on "Dec. 1, 2012" is displayed in the article display frame C11. The general advertisement frame C12 is an area in which advertising content which is stored in the information providing apparatus 100 by an advertiser, such as a company, is displayed. The sharing advertisement frame C13 is an area in which the share panel posted by the user (for example, the user U2) of the terminal apparatus 10 is displayed.

The information providing apparatus 100 according to the embodiment distributes the web page W11 in which a miShare button B10 is displayed in the article display frame C11 to the terminal apparatus $10_1$. The miShare button B10 is used to generate a share panel which is link information to the web page W11. In the example illustrated in FIG. 2(b), when the user U1 presses the miShare button B10, the information providing apparatus 100 generates a share panel PN10 as the link information to the web page W11. A process of generating the share panel PN10 will be described in detail below. Next, the outline of the generation process will be described briefly.

First, when the miShare button B10 is pressed, the information providing apparatus 100 allows the user U1 to input comments related to the articles of the web page W11. The information providing apparatus 100 allows the user U1 to select a photograph image to be inserted into the share panel from the photograph images which are associated with the user U1 among the photograph images stored in the SNS server 200. Then, as illustrated in FIG. 2(b), the information providing apparatus 100 incorporates the title "the next-generation smart phone A is released!" of the article displayed in the article display frame C11 of the web page W11 into a title frame PA1, incorporates the comments input by the user U1 into a comment frame PA2, and incorporates the photograph image selected by the user U1 into an image frame PA3, thereby generating the share panel PN10. The share panel PN10 is an image associated with, for example, the uniform resource locator (URL) of the web page W11 and functions as a link image to the web page W11.

In FIG. 2(b), when a posting button for posting the share panel PN10 is pressed, the information providing apparatus 100 transmits the share panel PN10 to the SNS server 200. In this way, the user U1 can post the share panel PN10, which is the link information to the web page W11, to the SNS server 200 while browsing the web page W11.

Then, as illustrated in FIG. 2(c), the user U2 operates the terminal apparatus $10_2$ to transmit a request to access a web page W12 to the information providing apparatus 100. In this case, the information providing apparatus 100 distributes, to the terminal apparatus $10_2$, the web page W12 including the sharing advertisement frame C13 for displaying the share panel which is posted to the SNS server 200 by another user who is a friend of the user U2. When the web page W12 including the sharing advertisement frame C13 is received, the terminal apparatus $10_2$ accesses the SNS server 200, acquires the share panel posted by the user who is a friend of the user U2 from the SNS server 200, and displays the acquired share panel in the sharing advertisement frame C13.

In the example illustrated in FIG. 2(c), the terminal apparatus $10_2$ displays the share panel PN10 posted by the user U1 who is a friend of the user U2 in the sharing advertisement frame C13. In this state, when the user U2 presses the share panel PN10, the terminal apparatus $10_2$ transmits a request to access the web page W11 to the information providing apparatus 100. In this way, as illustrated in FIG. 2(d), the terminal apparatus $10_2$ displays the web page W11.

Although not illustrated in FIG. 2, the share panel posted by another user who is a friend of the user U1 is displayed in the sharing advertisement frame C13 illustrated in FIG. 2. In addition, the share panel posted by another user who is a friend of the user U2 is displayed in the sharing advertisement frame C13 illustrated in FIG. 2(d). In the example illustrated in FIG. 2, when there is no share panel to be displayed in the sharing advertisement frame C13, advertising content inserted by an advertiser, such as a company, may be displayed in the sharing advertisement frame C13, similarly to the general advertisement frame C12.

As such, the information providing apparatus 100 according to the embodiment generates the share panel, which is the link information to the web page, in response to the operation of the user. When an access request is received from the terminal apparatus 10, the information providing apparatus 100 distributes the web page in which the share panel posted by the user who is a friend of the user of the terminal apparatus 10 in the social networking service is displayed.

In this way, the information providing apparatus 100 can distribute the share panel which is likely to be clicked by the user as advertisements. For this point, in general, the user is more likely to click the content posted by the friend than the advertising content inserted by, for example, a company. This is because the user desires to click the content processed by the friend. That is, the information providing apparatus 100 according to the embodiment displays the share panel processed by the friend in the web page. Therefore, it is possible to distribute advertisements with high customer appeal. In the example illustrated in FIG. 2, the user U2 is likely to click the share panel PN10 and to browse the web page W11. Therefore, the company (for example, the company which sells the smart phone A) whose articles are described in the web page W11 can obtain a high advertising effect. Next, the information providing apparatus 100 and the SNS server 200 which perform the information providing process will be described in detail.

3. Structure of Information Providing Apparatus

Figure 3:
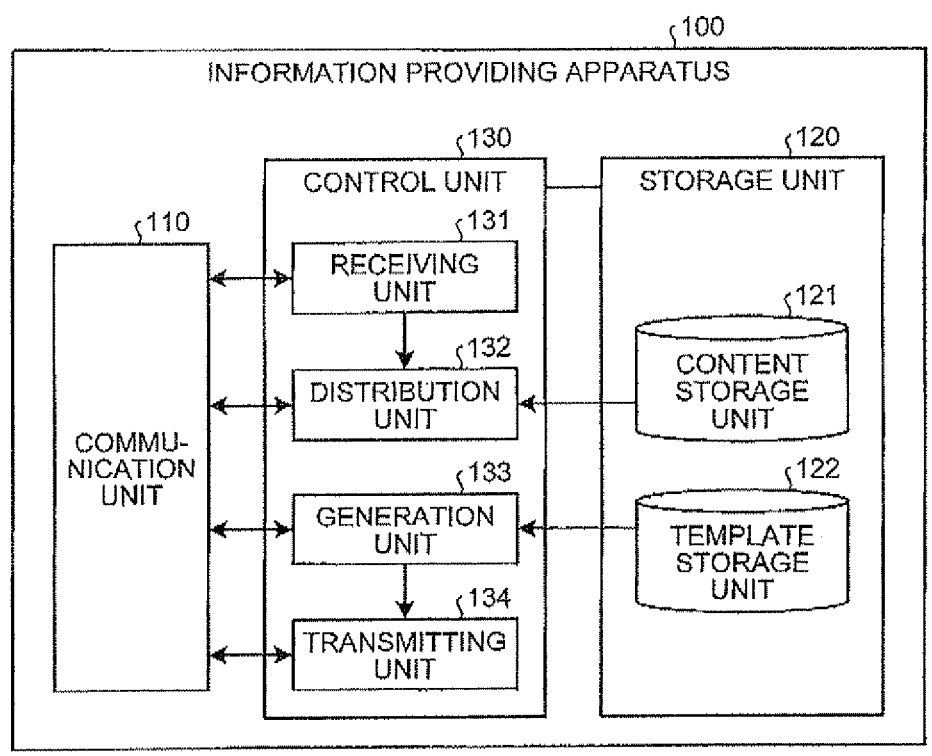
FIG. 3 is a diagram illustrating an example of the structure of the information providing apparatus according to the embodiment.

Next, the structure of the information providing apparatus 100 according to the embodiment will be described with reference to FIG. 3. FIG. 3 is a diagram illustrating an example of the structure of the information providing apparatus 100 according to the embodiment. As illustrated in FIG. 3, the information providing apparatus 100 includes a communication unit 110, a storage unit 120, and a control unit 130. The information providing apparatus 100 may include an input unit (for example, a keyboard or a mouse) which receives various operation from the administrator who uses the information providing apparatus 100 or a display unit (for example, a liquid crystal display) which displays various kinds of information.

Communication Unit 110

The communication unit 110 is implemented by, for example, a network interface card (NIC). The communication unit 110 is connected to the network N illustrated in FIG. 1 by wire or wirelessly and transmits and receives information to and from the terminal apparatus 10 or the SNS server 200 through the network N.

Storage Unit 120

The storage unit 120 is implemented by, for example, a semiconductor memory element, such as random access memory (RAM) or flash memory, or a storage device, such as a hard disk or an optical disk. As illustrated in FIG. 3, the storage unit 120 includes a content storage unit 121 and a template storage unit 122.

Content Storage Unit 121

The content storage unit 121 stores a web page or a component forming the web page as an example of content. For example, the content storage unit 121 stores article data or images displayed in the web page as the component forming the web page.

Template Storage Unit 122

The template storage unit 122 stores a template which is the form of the share panel. FIG. 4 illustrates an example of the template storage unit 122 according to the embodiment. As illustrated in FIG. 4, the template storage unit 122 stores a plurality of templates TP1 to TP3 each including a title frame PA1 in which, for example, the title of a web page, which is a link destination, is displayed, a comment frame PA2 in which the comments input by the user are displayed, and an image frame PA3 in which the photograph image selected by the user is displayed.

As illustrated in FIG. 4, in some cases, the templates TP1 to TP3 stored in the template storage unit 122 have different backgrounds, different arrangements of the display frames PA1 to PA3, or different shapes of the speech balloon of the comment frame PA2. When the share panel is generated, the user can select a desired template from the templates TP1 to TP3 stored in the template storage unit 122. FIG. 2(b) illustrates an example in which the user U1 selects the template TP1.

Control Unit 130

Returning to FIG. 3, for example, a central processing unit (CPU) or a micro processing unit (MPU) executes a program (corresponding to an example of an information providing program) stored in the internal storage device (for example, the storage unit 120) using the RAM as a work area to implement the control unit 130. In addition, the control unit 130 is implemented by, for example, an integrated circuit, such as an application specific integrated circuit (ASIC) or a field programmable gate array (FPGA).

As illustrated in FIG. 3, the control unit 130 includes a receiving unit 131, a distribution unit 132, a generation unit 133, and a transmitting unit 134 and implements or performs the following information processing function or operation. The internal structure of the control unit 130 is not limited to that illustrated in FIG. 3, but the control unit 130 may have any structure as long as it can perform the following information processing.

Receiving Unit 131

The receiving unit 131 receives a request to access a web page from the terminal apparatus 10. For example, the receiving unit 131 receives an HTTP request, which is a request to acquire the web page described by a language, such as a hypertext markup language (HTML), from the terminal apparatus 10 according to a hypertext transfer protocol (HTTP).

Distribution Unit 132

When the receiving unit 131 receives the access request, the distribution unit 132 distributes the web page corresponding to the access request to the terminal apparatus 10, which is the transmission source of the access request, on the basis of various types of content stored in the content storage unit 121.

As described with reference to FIG. 2, the distribution unit 132 according to the embodiment distributes the web page in which the miShare button B10 for generating the share panel is displayed to the terminal apparatus 10. Therefore, the user of the terminal apparatus 10 can press the miShare button B10 to generate the share panel.

The distribution unit 132 according to the embodiment distributes the web page including the sharing advertisement frame in which the share panel posted by the user who is a friend of the user who has transmitted the access request is displayed in the social networking service provided by the SNS server 200. Specifically, the distribution unit 132 distributes, to the terminal apparatus 10, the web page including the sharing advertisement frame into which information indicating the transmission of a share panel acquisition request to the SNS server 200 (for example, the URL of the SNS server 200 indicating the share panel acquisition request) is inserted. Therefore, when the web page including the sharing advertisement frame is received, the terminal apparatus 10 transmits the share panel acquisition request to the SNS server 200 and displays the share panel which is transmitted from the SNS server 200 in response to the acquisition request in the sharing advertisement frame.

For example, in the example illustrated in FIG. 2(c), when receiving the web page W12 including the sharing advertisement frame C13 from the information providing apparatus 100, the terminal apparatus 10$_2$ transmits a share panel acquisition request to the SNS server 200. Then, the terminal apparatus 10$_2$ acquires the share panel PN10 from the SNS server 200 and displays the acquired share panel PN10 in the sharing advertisement frame C13.

Generation Unit 133

When the user of the terminal apparatus 10 performs operation for generating the share panel, the generation unit 133 performs a share panel generation process. Specifically, when receiving a share panel generation request from the terminal apparatus 10 which has received the web page distributed by the distribution unit 132, the generation unit 133 performs the share panel generation process in response to the share panel generation request. Next, an example of the share panel generation process performed by the generation unit 133 according to the embodiment will be described with reference to FIG. 5.

FIG. 5(a) illustrates a state in which the web page W11 is displayed on the browser of the terminal apparatus 10, similarly to FIG. 2(a). In the example illustrated in FIG. 5(a), when the user presses the miShare button B10, the terminal apparatus 10 transmits a notice indicating the generation of the share panel to the SNS server 200 to log in the SNS server 200. For example, the terminal apparatus 10 transmits the user ID (the SNS-side user ID which will be described below) and password input by the user to the SNS server 200 to log in the SNS server 200. Then, when the login of the user succeeds, the SNS server 200 transmits a predetermined number of photograph images associated with the user to the terminal apparatus 10.

Here, the "photograph images associated with the user" will be described. In the social networking service provided by the SNS server 200, each user can associate the users (friends or them) with the photograph images posted by the users or the photograph images posted by the friends. In this case, each user can associate the users with all photograph images and can also associate the users with some areas of the photograph images. For example, when there are a plurality of users in the photograph image, each user can associate the users in the areas with some areas of the photograph image. The association of the user with the photograph image is referred to as "tagging".

Figure 5:
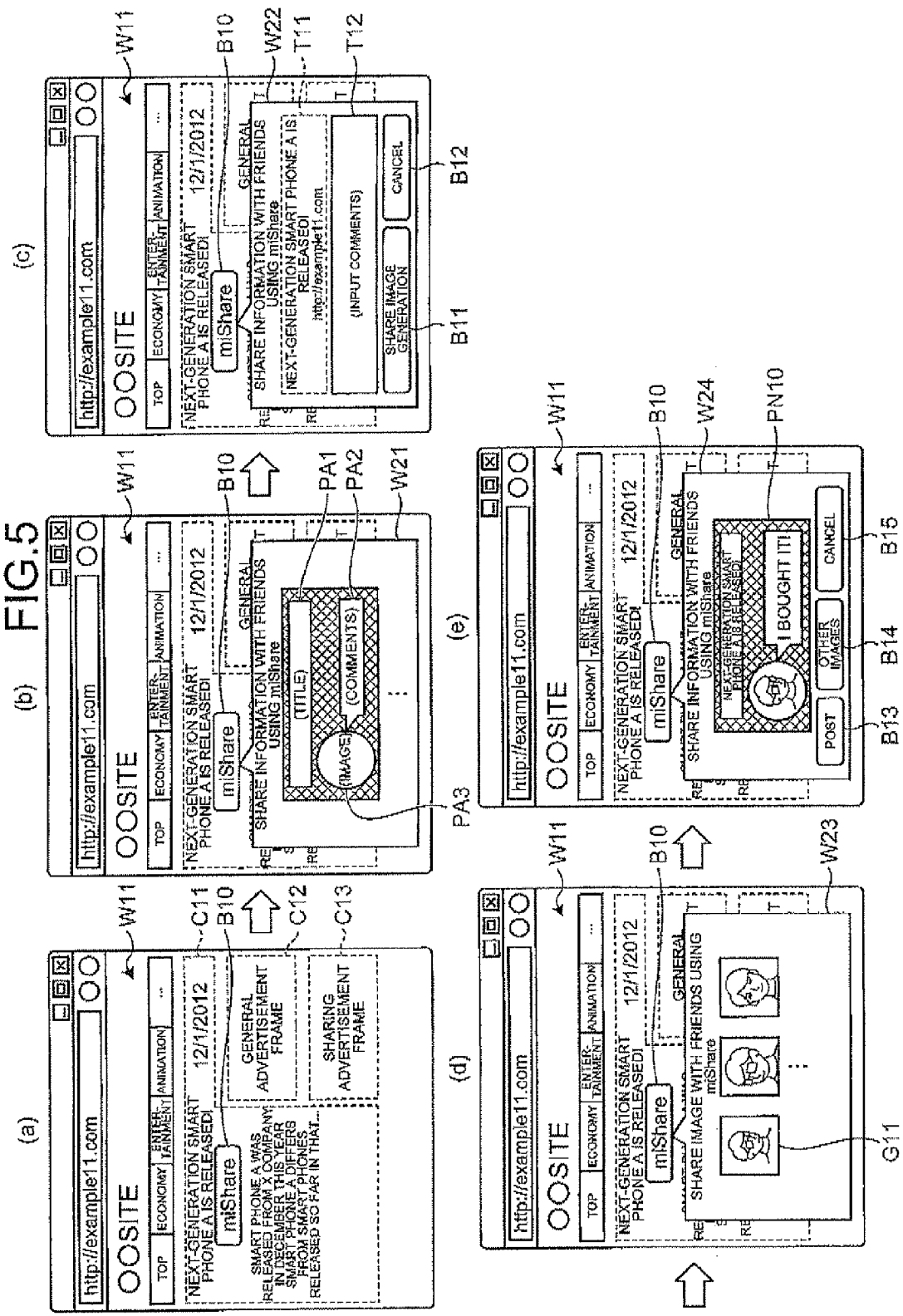
FIG. 5 is a diagram illustrating an example of a share panel generation process performed by a generation unit according to the embodiment.

Returning to FIG. 5, when the miShare button B10 is pressed in the example illustrated in FIG. 5(a), the terminal apparatus 10 transmits a share panel generation request to the information providing apparatus 100. When receiving the share panel generation request from the terminal apparatus 10, the generation unit 133 of the information providing apparatus 100 transmits a template selection screen W21 to the terminal apparatus 10, as illustrated in FIG. 5(b). Specifically, the generation unit 133 acquires the templates stored in the template storage unit 122 and transmits the template selection screen W21 on which a list of the acquired templates is displayed to the terminal apparatus 10.

Then, when the user selects the template from the template selection screen W21, the generation unit 133 transmits a comment input screen W22 to the terminal apparatus 10, as illustrated in FIG. 5(c). The comment input screen W22 includes a title display field T11, a comment input field T12, a share image generation button B11, and a cancel button B12. The title (in this example, the "next-generation smart phone A is released!") of the article displayed in the web page W11 and the URL of the web page W11 are displayed in the title display field T11 such that they cannot be edited. The comment input field T12 is an input field to which the user inputs comments.

When the cancel button B12 is pressed on the comment input screen W22, the comment input screen W22 is closed and display returns to the state illustrated in FIG. 5(a). On the other hand, when the share image generation button B11 is pressed with comments input to the comment input field T12, the generation unit 133 transmits a share image selection screen W23 illustrated in FIG. 5(d) to the terminal apparatus 10. A list of the photograph images transmitted from the SNS server 200 is displayed in the share image selection screen W23. In this case, the area to which the user is tagged in the photograph image is displayed on the share image selection screen W23.

Then, when the photograph image is selected from the share image selection screen W23, the generation unit 133 generates the share panel PN10 as illustrated in FIG. 5(e). It is assumed that the template TP1 illustrated in FIG. 4 is selected from the template selection screen W21 illustrated in FIG. 5(b), comments "I bought it!" are input to the comment input screen W22 illustrated in FIG. 5(c), and a photograph image G11 is selected from the share image selection screen W23 illustrated in FIG. 5(d). In this case, the generation unit 133 incorporates the article title "the next-generation smart phone A is released!" into the title frame PA1 of the template, incorporates the comments "I bought it!" into the comment frame PA2, and incorporates the photograph image G11 into the image frame PA3, thereby generating the share panel PN10. In this case, the generation unit 133 incorporates the area to which the user is tagged in the photograph image G11 into the image frame PA3.

Then, as illustrated in FIG. 5(e), the generation unit 133 transmits a confirmation screen W24 including the share panel PN10 to the terminal apparatus 10. The confirmation screen W24 includes a posting button B13, an "other image" button B14, and a cancel button B15 in addition to the share panel PN10.

When the posting button B13 is pressed on the confirmation screen W24, the generation unit 133 outputs the share panel PN10 to the transmitting unit 134. When the "other image" button B14 is pressed, display returns to the state illustrated in FIG. 5(d). In this case, the terminal apparatus 10 may acquire new photograph images from the SNS server 200 and display a list of the acquired photograph images on the share image selection screen W23. When the cancel button B15 is pressed on the confirmation screen W24, display returns to the state illustrated in FIG. 5(a).

In this way, the generation unit 133 generates the share panel PN10 and outputs the generated share panel PN10 to the transmitting unit 134. In FIG. 5, each screen, such as the comment input screen W21, is displayed in a pop-up form. However, these screens may be displayed in the form of screen transition from the web page W11. In FIG. 5, the title of the article is displayed in the title display field T11 of the comment input screen W22 such that it cannot be edited. However, the title of the article may be displayed such that it can be edited. In FIG. 5, the generation unit 133 transmits the web pages forming each screen, such as the comment input screen W21, to the terminal apparatus 10. However, the web page W11 illustrated in FIG. 5(a) and the web pages forming each screen may be transmitted to the terminal apparatus 10. Although not illustrated in FIG. 5(b), a cancel button for closing the template selection screen W21 to return to the state illustrated in FIG. 5(a) may be displayed on the template selection screen W21. Although not illustrated in FIG. 5(d), the share image selection screen W23 may include a return button for returning to the comment input screen W22 or a cancel button for closing the share image selection screen W23 to return to the state illustrated in FIG. 5(a).

Transmitting Unit 134

The transmitting unit 134 transmits the share panel generated by the generation unit 133 to the SNS server 200. In this case, the transmitting unit 134 transmits the share panel together with specific information (for example, an authentication key or an SNS-side user ID which will be described below) for specifying the terminal apparatus 10 which has generated the share panel to the SNS server 200.

4. Structure of SNS Server

Figures 6, 7:
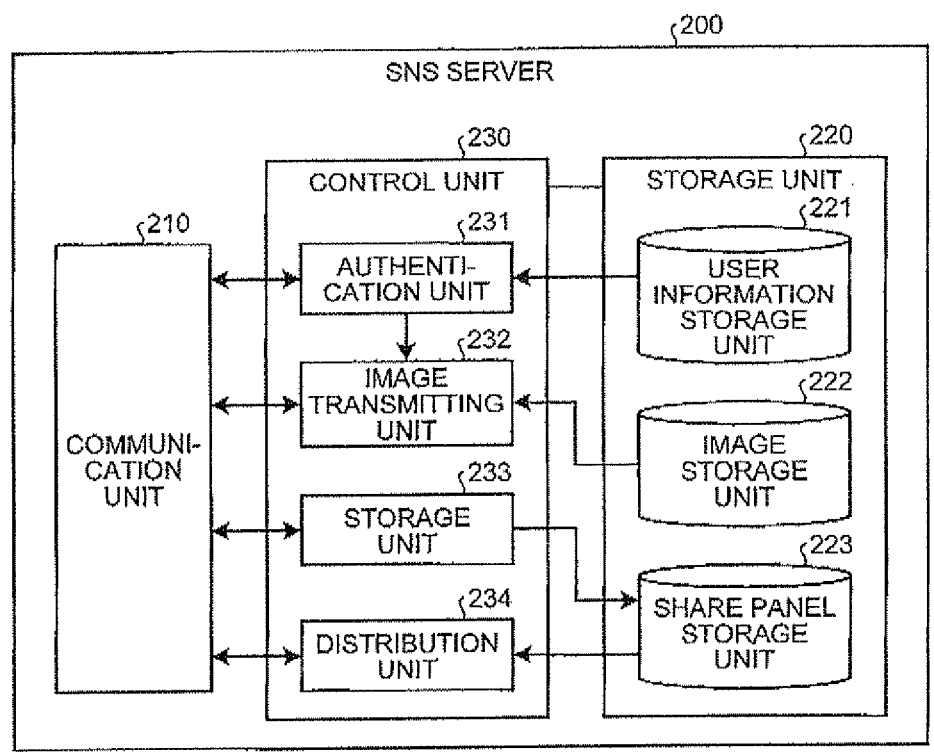
FIG. 6 is a diagram illustrating an example of the structure of an SNS server according to the embodiment.
FIG. 7 is a diagram illustrating an example of a user information storage unit according to the embodiment.

Next, the structure of the SNS server 200 according to the embodiment will be described with reference to FIG. 6. FIG. 6 is a diagram illustrating an example of the structure of the SNS server 200 according to the embodiment. As illustrated in FIG. 6, the SNS server 200 includes a communication unit 210, a storage unit 220, and a control unit 230. The SNS server 200 may include an input unit (for example, a keyboard or a mouse) which receives various operation from the administrator who uses the SNS server 200 or a display unit (for example, a liquid crystal display) which displays various kinds of information.

Communication Unit 210

The communication unit 210 is implemented by, for example, an NIC. The communication unit 210 is connected to the network N illustrated in FIG. 1 by wire or wirelessly and transmits and receives information to and from the terminal apparatus 10 or the information providing apparatus 100 through the network N.

Storage Unit 220

The storage unit 220 is implemented by, for example, a semiconductor memory element, such as a RAM or a flash memory, or a storage device, such as a hard disk or an optical disk. As illustrated in FIG. 6, the storage unit 220 includes a user information storage unit 221, an image storage unit 222, and a share panel storage unit 223.

User Information Storage Unit 221

The user information storage unit 221 stores information about the account of the user who uses the SNS server 200. FIG. 7 illustrates an example of the user information storage unit 221 according to the embodiment. In the example illustrated in FIG. 7, the user information storage unit 221 includes items, such as an "SNS-side user ID", a "password", and a "friend ID".

The "SNS-side user ID" indicates an identifier for identifying the user in the SNS server 200. The "password" indicates the password of the user managed by the SNS server 200. The "friend ID" indicates the SNS-side user ID of another user who is a friend of the user in the social networking service.

That is, FIG. 7 illustrates an example in which the password of the user identified by an SNS-side user ID "U1" is "P21". In addition, in the example illustrated in FIG. 7, the user with the SNS-side user ID "U1" is a friend of the user with an SNS-side user ID "U2" and the user with an SNS-side user ID "U3" in the social networking service provided by the SNS server 200.

Image Storage Unit 222

The image storage unit 222 stores the photograph image posted (uploaded) by each user who uses the social networking services provided by the SNS server 200. The image storage unit 222 according to the embodiment stores the photograph images to which the users are tagged for each user. FIG. 8 illustrates an example of the image storage unit 222 according to the embodiment. In the example illustrated in FIG. 8, the image storage unit 222 includes items, such as an "SNS-side user ID", a "tagged image", and a "tag area".

The "SNS-side user ID" corresponds to the SNS-side user ID illustrated in FIG. 7. The "tagged image" indicates the file name of the photograph image to which the user is tagged. The "tag area" indicates the area associated with the user in the photograph image. FIG. 8 illustrates an example in which simplified information (for example, R11) is stored in the "tag area". For example, coordinates indicating the area of the photograph image (in the case of a rectangular area, the coordinates of four vertexes) are stored in the "tag area".

That is, FIG. 8 illustrates an example in which the user identified by the SNS-side user ID "U1" is associated with an area "R11" of the photograph image with a file name "G11.gif", an area "R12" of the photograph image with a file name "G12.gif", and an area "R13" of the photograph image with a file name "G13.gif".

Share Panel Storage Unit 223

The share panel storage unit 223 stores the share panel transmitted by the transmitting unit 134 of the information providing apparatus 100. FIG. 9 illustrates an example of the share panel storage unit 223 according to the embodiment. In the example illustrated in FIG. 9, the share panel storage unit 223 includes items, such as an "SNS-side user ID" and a "share panel". The "SNS-side user ID" corresponds to the SNS-side user ID illustrated in FIGS. 7 and 8. The "share panel" indicates the file name of the share panel posted by the user through the information providing apparatus 100.

That is, FIG. 9 illustrates an example in which the user identified by the SNS-side user ID "U1" posts the share panels with file names "PN10.gif", "PN20.gif", and "PN30.gif" to the SNS server 200.

Control Unit 230

Returning to FIG. 6, for example, a CPU or a MPU executes a program stored in the internal storage device (for example, the storage unit 220) using RAM as a work area to implement the control unit 230. In addition, the control unit 230 is implemented by, for example, an integrated circuit, such as an ASIC or an FPGA.

As illustrated in FIG. 6, the control unit 230 includes an authentication unit 231, an image transmitting unit 232, a storage unit 233, and a distribution unit 234 and performs the following information processing function or operation. In addition, the internal structure of the control unit 230 is not limited to that illustrated in FIG. 6, but the control unit 230 may have any structure as long as it can perform the following information processing.

Authentication Unit 231

When an authentication request is received from the terminal apparatus 10, the authentication unit 231 authenticates the user of the terminal apparatus 10. For example, the authentication unit 231 transmits a login screen to the terminal apparatus 10 and determines whether a combination of the user ID and the password input to the login screen has been stored in the user information storage unit 221. When the combination of the user ID and the password has been stored in the user information storage unit 221, the authentication unit 231 determines that the authentication succeeds. When the combination of the user ID and the password has not been stored in the user information storage unit 221, the authentication unit 231 determines that the authentication fails.

In the example illustrated in FIG. 5(a), when the miShare button B10 is pressed, the terminal apparatus 10 transmits a notice indicating the generation of a share panel to the SNS server 200. In this case, the authentication unit 231 transmits the login screen to the terminal apparatus 10, thereby performing the above-mentioned authentication process.

Image Transmitting Unit 232

The image transmitting unit 232 transmits the photograph images stored in the image storage unit 222 to the terminal apparatus 10. Specifically, when the notice indicating the generation of the share panel is received from the terminal apparatus 10 and the authentication by the authentication unit 231 succeeds, the image transmitting unit 232 acquires the photograph image to which the user of the terminal apparatus 10 is tagged from the image storage unit 222 and transmits the acquired photograph image to the terminal apparatus 10. In this case, when the number of photograph images acquired from the image storage unit 222 is equal to or greater than a predetermined threshold value, the image transmitting unit 232 transmits a predetermined number of (for example, 10) photograph images to the terminal apparatus 10.

Storage Unit 233

The storage unit 233 stores the share panel transmitted by the transmitting unit 134 of the information providing apparatus 100 in the share panel storage unit 223. Specifically, the storage unit 233 receives the share panel and the specific information for specifying the terminal apparatus 10 from the transmitting unit 134 and stores the share panel in the share panel storage unit 223 so as to be associated with the SNS-side user ID specified by the received specific information.

Distribution Unit 234

When a share panel acquisition request is received from the terminal apparatus 10, the distribution unit 234 distributes the share panel posted by the user who is a friend of the user of the terminal apparatus 10 to the terminal apparatus 10. Specifically, the distribution unit 234 acquires the friend ID corresponding to the SNS-side user ID of the terminal apparatus 10 which has transmitted the share panel acquisition request from the user information storage unit 221 and acquires the share panel corresponding to the acquired friend ID (SNS-side user ID) from the share panel storage unit 223. Then, the distribution unit 234 distributes an arbitrary share panel among the share panels acquired from the share panel storage unit 223 to the terminal apparatus 10 which has transmitted the share panel acquisition request.

The example illustrated in FIG. 2(c) will be described. Here, it is assumed that the user information storage unit 221 is in the state illustrated in FIG. 7 and the share panel storage unit 223 is in the state illustrated in FIG. 9. In addition, it is assumed that the SNS-side user ID of the user U1 is "U1" and the SNS-side user ID of the user U2 is "U2". In the example illustrated in FIG. 2(c), the distribution unit 234 of the SNS server 200 receives a share panel acquisition request from the terminal apparatus $10_2$. In this case, the distribution unit 234 acquires the friend ID "U1" corresponding to the SNS-side user ID "U2" of the user U2 from the user information storage unit 221. Then, the distribution unit 234 acquires the share panels "G11.gif", "G12.gif", and "G13.gif" corresponding to the friend ID "U1" from the share panel storage unit 223. Then, the distribution unit 234 distributes an arbitrary share panel (for example, "G11.gif") among the share panels "G11.gif", "G12.gif", and "G13.gif" to the terminal apparatus $10_2$.

5. Share Panel Posting Process

Next, a share panel posting process in the network system 1 according to the embodiment will be described with reference to FIG. 10. FIG. 10 is a sequence diagram illustrating the procedure of the share panel posting process in the network system 1 according to the embodiment.

As illustrated in FIG. 10, the user operates the terminal apparatus 10 to transmit a request to access a web page to the information providing apparatus 100 (Step S101). Then, the receiving unit 131 of the information providing apparatus 100 receives the access request from the terminal apparatus 10. Then, the distribution unit 132 of the information providing apparatus 100 distributes the web page in which the miShare button B10 for generating a share panel is displayed to the terminal apparatus 10 in response to the access request received by the receiving unit 131 (Step S102).

Then, it is assumed that the terminal apparatus 10 receives an operation of pressing the miShare button B10 displayed in the web page from the user (Step S103). In this case, the terminal apparatus 10 transmits a notice indicating the generation of the share panel to the SNS server 200 to log in the SNS server 200 (Step 2104). Then, the authentication unit 231 of the SNS server 200 receives the SNS-side user ID and the password from the terminal apparatus 10 to perform the authentication process. In the example illustrated in FIG. 10, it is assumed that, when the authentication succeeds, the authentication unit 231 issues an authentication key indicating that the login of the user of the terminal apparatus 10 has succeeded, stores the issued authentication key so as to be associated with the SNS-side user ID, and transmits the issued authentication key to the terminal apparatus 10. The authentication key corresponds to, for example, information such as a one-time password issued whenever the terminal apparatus 10 accesses the SNS server.

Then, when the login process by the authentication unit 231 succeeds, the image transmitting unit 232 of the SNS server 200 acquires the photograph image to which the user of the terminal apparatus 10 is tagged from the image storage unit 222 and transmits the acquired photograph image to the terminal apparatus 10 (Step S105).

Then, the generation unit 133 of the information providing apparatus 100 acquires share panel information required to generate the share panel or the authentication key issued by the authentication unit 231 of the SNS server 200 in Step S104 from the terminal apparatus 10 (Step S106). The term "share panel information" indicates the template which is selected from the template selection screen W21 illustrated in FIG. 5 by the user, the comments which are input to the comment input screen W22 by the user, or the photograph image which is selected from the share image selection screen W23 by the user.

Then, the generation unit 133 generates a share panel on the basis of the share panel information acquired from the terminal apparatus 10 (Step S107). Then, the transmitting unit 134 transmits the share panel generated by the generation unit 133 and the authentication key acquired from the terminal apparatus 10 to the SNS server 200 (step S108).

Then, the storage unit 233 of the SNS server 200 stores the share panel received from the transmitting unit 134 of the information providing apparatus 100 in the share panel storage unit 223 (Step S109). In this case, the storage unit 233 specifies the SNS-side user ID of the user who has posted the share panel on the basis of the authentication key received from the transmitting unit 134 and stores the share panel in the share panel storage unit 223 so as to be associated with the specified SNS-side user ID.

Then, when the process of storing the share panel is completed, the storage unit 233 transmits a completion notice to the information providing apparatus 100 (Step S110). Then, when receiving the completion notice from the storage unit 233, the transmitting unit 134 of the information providing apparatus 100 transmits the completion notice to the terminal apparatus 10 (Step S111).

6. Share Panel Display Process

Next, a share panel display process in the network system 1 according to the embodiment will be described with reference to FIG. 11. FIG. 11 is a sequence diagram illustrating the procedure of the share panel display process in the network system 1 according to the embodiment.

As illustrated in FIG. 11, the user operates the terminal apparatus 10 to transmit a request to access a web page to the information providing apparatus 100 (Step S201). Then, the distribution unit 132 of the information providing apparatus 100 distributes the web page in which the share panel posted by the user who is a friend of the user of the terminal apparatus 10 is displayed to the terminal apparatus 10 (Step S202). For example, as in the example illustrated in FIG. 2, the distribution unit 132 distributes the web page including the sharing advertisement frame C13.

Then, when the web page including the sharing advertisement frame C13 is received from the information providing apparatus 100, the terminal apparatus 10 transmits a share panel acquisition request to the SNS server 200 to log in the SNS server 200 (Step S203). In this case, the authentication unit 231 of the SNS server 200 receives, for example, the SNS-side user ID and the password from the terminal apparatus 10 to perform the authentication process.

Then, when the authentication process by the authentication unit 231 succeeds, the distribution unit 234 of the SNS server 200 searches for the share panel posted by the user who is a friend of the user of the terminal apparatus 10 from the share panel storage unit 223 (Step S204). Then, the distribution unit 234 distributes the searched share panel to the terminal apparatus 10 (Step S205).

Then, the terminal apparatus 10 receives the share panel distributed by the distribution unit 234 and displays the received share panel in the sharing advertisement frame C13 of the web page (Step S206).

7. Modifications

Various modifications of the network system 1 according to the above-described embodiment can be made. Next, other embodiments of the network system 1 will be described.

7-1. Login to SNS Server 200

In the above-described embodiment, as in Step S104 of FIG. 10 or Step S203 of FIG. 11, the terminal apparatus 10 logs in the SNS server 200 when it accesses the SNS server 200. However, the web page provided by the information providing apparatus 100 may include, for example, a login button for logging in the SNS server 200. In this case, when the user of the terminal apparatus 10 has logged in the SNS server 200 before Step S104 of FIG. 10 or Step S203 of FIG. 11, the login process in Step S104 of FIG. 10 or Step S203 of FIG. 11 may not be performed.

When the user logs in the SNS server 200 from the web page provided by the information providing apparatus 100, the SNS server 200 may store the login state in, for example, a cache. In this case, when the user who has logged in the SNS server 200 acquires a new web page from the information providing apparatus 100, it is possible to display the web page with the user logged in the SNS server 200 as long as the login state in the cache is not cancelled in the SNS server 200. In this case, the login process in Step S104 of FIG. 10 or Step S203 of FIG. 11 may not be performed.

7-2. Prevention of Transition to Same Page

In the above-described embodiment, the information providing apparatus 100 or the SNS server 200 may perform control such that the share panel moved to the web page which is currently being displayed is not displayed. Specifically, when transmitting the share panel acquisition request to the SNS server 200 (corresponding to Step S203 of FIG. 11), the terminal apparatus 10 also transmits the share panel acquisition request to the URL of the web page which is currently being displayed. In this case, the distribution unit 234 of the SNS server 200 acquires the share panel into which the URL received from the terminal apparatus 10 is not inserted among the share panels stored in the share panel storage unit 223 and distributes the share panel to the terminal apparatus 10. In this way, the terminal apparatus 10 can display the share panel moved to a web page different from the web page which is currently being displayed.

The invention is not limited to the above-mentioned example. For example, the SNS server 200 may transmit a plurality of share panels to the terminal apparatus 10 and the terminal apparatus 10 may display an arbitrary share panel among the share panels received from the SNS server 200. In this case, the terminal apparatus 10 displays the share panel into which the URL of the web page which is currently being displayed is not inserted. Therefore, the terminal apparatus 10 can display the share panel moved to another web page.

7-3. Sharing Advertisement Frame

In the above-described embodiment, as in the example illustrated in FIG. 2(c), the share panel is displayed in the sharing advertisement frame C13 of the web page. However, the share panel may not be displayed in the sharing advertisement frame C13, but information which can be browsed when the user logs in the SNS server 200 may be displayed in the sharing advertisement frame C13. For example, the sharing advertisement frame C13 may be displayed such that it can be scrolled and the page or share panel which is posted to the SNS server 200 by the friend may be displayed in the sharing advertisement frame C13. In this case, the user of the terminal apparatus 10 can also browse the share panel which is posted to the SNS server 200 by the friend.

7-4. Advertiser Template

In the above-described embodiment, as in the example illustrated in FIG. 4, the information providing apparatus 100 stores the template of the share panel in advance. However, the template stored in the information providing apparatus 100 may be provided by an advertiser such as a company. This will be described with reference to FIGS. 12 to 14.

FIG. 12 is a diagram illustrating an example of the structure of a network system 2 according to a modification. As illustrated in FIG. 12, the network system 2 according to the modification differs from the network system 1 illustrated in FIG. 1 in that it includes an advertiser apparatus 300. In the example illustrated in FIG. 12, the network system 2 includes one advertiser apparatus 300. However, the network system 2 may include a plurality of advertiser apparatuses 300.

The advertiser apparatus 300 is an information processing apparatus, such as a PC used by an advertiser, for example, a company, and provides the template of the share panel to the information providing apparatus 100. For example, the advertiser apparatus 300 provides a template including an advertisement article or an image related to a product or a service to be advertised to the information providing apparatus 100.

In this example, the template storage unit 122 of the information providing apparatus 100 stores the templates for each advertiser. FIG. 13 illustrates an example of the template storage unit 122 according to the modification. As illustrated in FIG. 13, the template storage unit 122 according to the modification includes items, such as an "advertiser ID", a "type", and a "template". The "advertiser ID" indicates an identifier for identifying the advertiser. The "type" indicates the type to which the advertiser belongs and corresponds to, for example, the type to which the product or service advertised by the advertiser belongs. The "template" indicates the template provided by the advertiser apparatus 300.

That is, FIG. 13 illustrates an example in which the advertiser identified by an advertiser ID "X1" belongs to a type "car" and provides templates "TP11" and "TP12". As such, the advertiser apparatus 300 may provide a plurality of templates to the information providing apparatus 100. However, the invention is not limited thereto, but the advertiser apparatus 300 may provide one template to the information providing apparatus 100.

Figure 14:
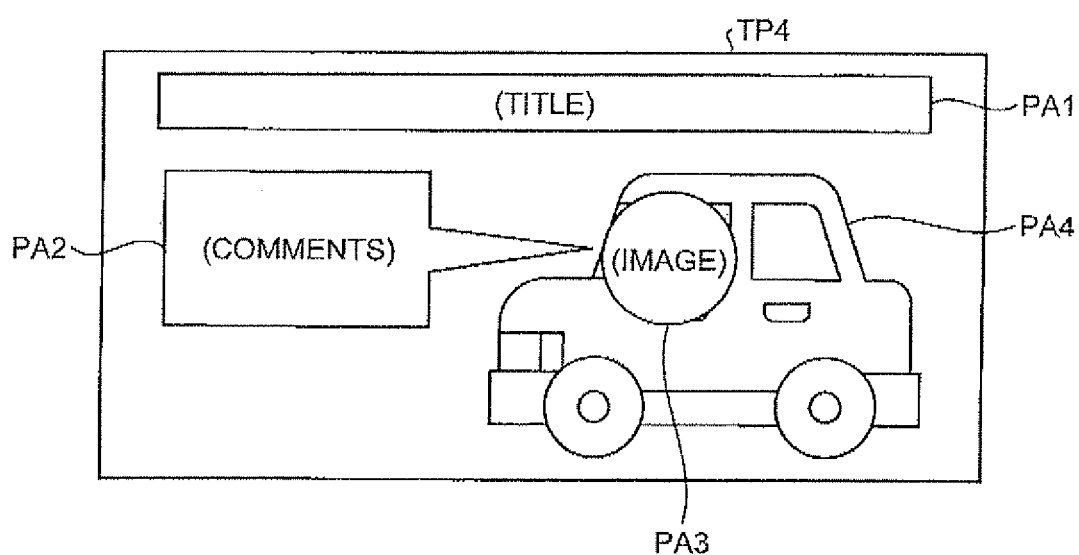
FIG. 14 is a diagram illustrating an example of a template provided by an advertiser apparatus.

FIG. 14 illustrates an example of the template provided by the advertiser apparatus 300. It is assumed that a template TP4 illustrated in FIG. 14 is provided by an advertiser (for example, a car manufacturer) belonging to the type "car". As illustrated in FIG. 14, the template TP4 includes a title frame PA1, a comment frame PA2, and an image frame PA3, similarly to the templates TP1 to TP3 illustrated in FIG. 4, and has a car image PA4 drawn therein. For example, the car image PA4 corresponds to the car which is sold by the advertiser.

When the template TP4 is selected by the user, the generation unit 133 generates a share panel in which a photograph image is incorporated into the driver's seat of the car. Therefore, the advertiser who provides the template TP4 can distribute the share panel as the advertisement of its own product or service. As described above, the user is likely to click the content posted by the friend. Therefore, the advertiser can provide the template related to its own product or service to the information providing apparatus 100 to distribute advertisements with high customer appeal.

The information provider who manages the information providing apparatus 100 may determine the amount of money paid to the advertiser on the basis of the rate of utilization of the template provided from the advertiser. Alternatively, the information provider may determine the amount of money paid to the advertiser on the basis of, for example, the click through rate (CTR), the number of displays (impression), or the conversion rate (CVR) of the share panel which is generated using the template provided from the advertiser.

In the example illustrated in FIGS. 12 to 14, the generation unit 133 of the information providing apparatus 100 may transmit a template related to the attributes of the web page, which is the link destination of the share panel, to the terminal apparatus 10. For example, when generating the share panel of the web page into which articles related to the car are inserted, the generation unit 133 acquires the template corresponding to the type "car" from the template storage unit 122 illustrated in FIG. 13 and transmits the template to the terminal apparatus 10. Therefore, the information providing apparatus 100 can generate the share panel with a high relation with the web page, which is a link destination. As a result, it is possible to distribute the share panel with high customer appeal.

In the example illustrated in FIGS. 12 to 14, the information providing apparatus 100 may not store the template provided from the advertiser apparatus 300, but may instruct the advertiser apparatus 300 to transmit the template to the terminal apparatus 10 when the share panel is generated.

7-5. Share Panel

In the above-described embodiment, the generation unit 133 of the information providing apparatus 100 generates the share panel including the title of the article, the comments of the user, and the photograph image to which the user is tagged. However, the share panel generated by the generation unit 133 is not limited to this example. Next, another example of the share panel will be described.

For example, the generation unit 133 may incorporate the URL of the web page, which is a link destination, into the share panel. In this case, a URL display frame in which the URL of the web page is displayed is provided in the template of the share panel and the generation unit 133 incorporates the URL of the web page into the URL display frame. The invention is not limited to this example, but the generation unit 133 may incorporate the URL of the web page into, for example, the title frame PA1.

For example, the generation unit 133 may not generate the share panel including all of the "title of the article", the "comments of the user", and the "tagged photograph image", but may generate a share panel including one or two of the above-mentioned items. In addition, the information providing apparatus 100 stores only one template. In this case, the generation unit 133 generates the share panel using the template, without allowing the user to select the template.

For example, the generation unit 133 may incorporate the image displayed in the web page into the share panel. In this case, an in-page image display frame in which the image in the web page is displayed is provided in the template of the share panel and the generation unit 133 incorporates the image in the web page into the in-page image display frame.

For example, in some cases, an article related to a product and the image of the product are inserted into the article display frame C11 of the web page. In this case, the generation unit 133 incorporates both the image of the product and the title of the article into the share panel. In this way, it is possible to generate a share panel capable of improving the advertising effect of the product.

Figure 15:
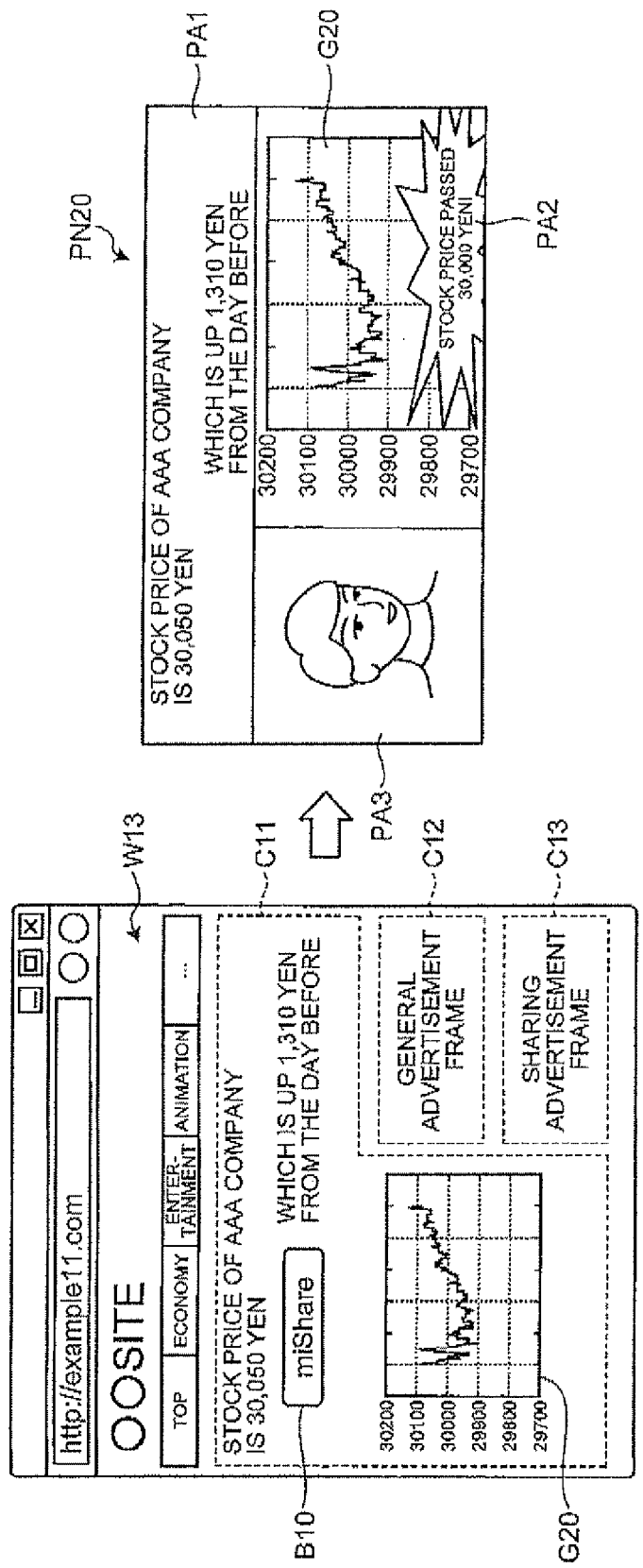
FIG. 15 is a diagram illustrating an example of a share panel according to the embodiment.

In some cases, the image of the stock chart of a predetermined company is inserted into the article display frame C11 of the web page. In this case, the generation unit 133 incorporates the image of the stock chart into the share panel. In this way, it is possible to generate a share panel for recording the stock of the company in addition to improving the advertising effect. This will be described with reference to FIG. 15. FIG. 15 is a diagram illustrating an example of the share panel according to the embodiment.

In the example illustrated in FIG. 15, a web page W13 includes "the stock price of an AAA company is 30,050 yen and is up +1,310 yen from the day before" as the title of the stock and a stock chart image G20 is inserted into the web page W13. In this case, as illustrated on the right side of FIG. 15, the generation unit 133 incorporates the chart image G20 into the in-page image display frame to generate a share panel PN20.

The invention is not limited to the example illustrated in FIG. 15. For example, the generation unit 133 may generate a share panel in which a search result screen of a search site is incorporated into the in-page image display frame or a share panel in which the image of an article for sale at auction in an auction site is incorporated into the in-page image display frame.

7-6. Display of Plurality of Share Panels

In the above-described embodiment, a single share panel is displayed in the web page. However, a plurality of share panels may be displayed in the web page. In this case, when transmitting a share panel acquisition request to the SNS server 200 (corresponding to Step S203 of FIG. 11), the terminal apparatus 10 may notify the SNS server 200 of the number of share panels to be acquired. Then, the distribution unit 234 of the SNS server 200 may acquire the share panels corresponding to the number of share panels notified by the terminal apparatus 10 from the share panel storage unit 223 and may distribute all of the acquired share panels to the terminal apparatus 10.

In addition, the terminal apparatus 10 may not notify the SNS server 200 of the number of share panels to be acquired, but the distribution unit 234 of the SNS server 200 may distribute a predetermined number of (for example, 10) share panels to the terminal apparatus 10. Then, the terminal apparatus 10 may select arbitrary share panels corresponding to the number of sharing advertisement frames C13 from a plurality of share panels received from the distribution unit 234 and display the selected share panels in the corresponding sharing advertisement frames C13.

Figure 16:
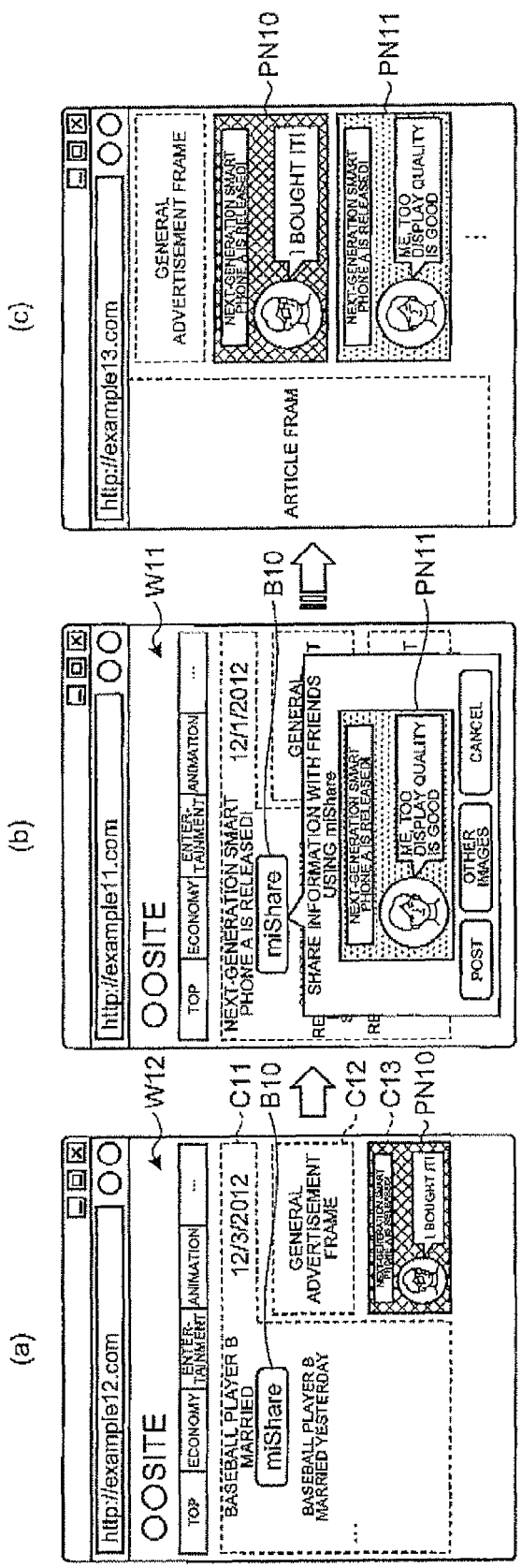
FIG. 16 is a diagram illustrating an example of the display of a plurality of share panels according to the embodiment.

The information providing apparatus 100 may associate a plurality of share panels related to the same web page. Specifically, when a second share panel is generated in a web page which appears by pressing a first share panel displayed in the sharing advertisement frame C13, the information providing apparatus 100 notifies the SNS server 200 of the second share panel and information indicating that the second share panel is associated with the first share panel. This will be described with reference to FIG. 16. FIG. 16 is a diagram illustrating an example of the display of a plurality of share panels according to the embodiment. In the following description, it is assumed that a panel ID for identifying the share panel is inserted into tag information in the share panel.

FIG. 16(a) illustrates a web page W12 including a share panel PN10, similarly to FIG. 2(c). In the example illustrated in FIG. 16(a), it is assumed that, when the user presses the share panel PN10, the terminal apparatus 10 displays a web page W11 and receives an operation of pressing a miShare button B10 of the web page W11. Then, it is assumed that the generation unit 133 of the information providing apparatus 100 generates a share panel PN11 illustrated in FIG. 16(b). In this case, when acquiring share panel information from the terminal apparatus 10 (corresponding to Step S106 of FIG. 10), the generation unit 133 also acquires the panel ID of the share panel PN10 which is the transition source of the web page W11. Then, the transmitting unit 134 of the information providing apparatus 100 transmits both the share panel PN11 and the panel ID of the share panel PN10 related to the share panel PN11 to the SNS server 200. Then, the storage unit 233 of the SNS server 200 stores the share panel PN11 in the share panel storage unit 223 and stores the panel ID of the share panel PN10 and the panel ID of the share panel PN11 in a predetermined storage unit so that the panel IDs are associated with each other.

Then, it is assumed that the distribution unit 234 of the SNS server 200 receives a share panel acquisition request from the terminal apparatus 10 of the user who is a friend of the user who has posted the share panel PN10 and the user who has posted the share panel PN11 (corresponding to Step S203 of FIG. 11). In this case, when acquiring the share panel PN10 from the share panel storage unit 223, the distribution unit 234 also acquires the share panel PN11 associated with the share panel PN10 and distributes the acquired share panels PN10 and PN11 to the terminal apparatus 10. Then, as illustrated in FIG. 16(c), the terminal apparatus 10 displays the share panels PN10 and PN11 which are associated with each other in the web page.

As such, the information providing apparatus 100 associates a plurality of share panels related to the same web page, which makes it possible to instruct the terminal apparatus 10 to display the share panels which are associated with each other. Therefore, the user who browses a plurality of share panels associated with each other can browse the comments of a plurality of users at a time. As a result, the information providing apparatus 100 can distribute the share panel with high customer appeal.

When a share panel acquisition request is received, the distribution unit 234 of the SNS server 200 may not acquire the overlapping share panels which are associated with each other from the share panel storage unit 223, contrary to the above-mentioned process. In other words, the distribution unit 234 may acquire the share panels which are not associated with each other from the share panel storage unit 223. In this case, the share panels moved to different web pages are displayed on the terminal apparatus 10 and the user can browse the share panels related to a plurality of kinds of web pages.

The invention is not limited to the example illustrated in FIG. 16, but the information providing apparatus 100 may associate a plurality of share panels in a predetermined order. For example, the information providing apparatus 100 may give a story to each of the share panels posted by a plurality of users and associate a plurality of share panels in the order of the stories. This will be described with reference to FIG. 17. FIG. 17 is a diagram illustrating an example of the display of a plurality of share panels according to the embodiment.

MiShare buttons B21 to B24 are displayed in a web page W11 illustrated in FIG. 17(a). The miShare buttons B21 to B24 have a function of giving a story to each of the share panels posted by a plurality of users. For example, among introduction, development, turn, and conclusion forming a story, the miShare button B21 corresponds to the "introduction", the miShare button B22 corresponds to the "development", the miShare button B23 corresponds to the "turn", and the miShare button B24 corresponds to the "conclusion".

In the example illustrated in FIG. 17(a), it is assumed that, when the miShare button B21 corresponding to the "introduction" is pressed, the generation unit 133 of the information providing apparatus 100 generates a share panel PN10. In this case, the generation unit 133 inserts information indicating the "introduction" among the introduction, the development, the turn, and the conclusion into the share panel PN10. For example, the generation unit 133 sets information indicating the "introduction" to the tag information of the share panel PN10. Then, the transmitting unit 134 of the information providing apparatus 100 transmits the share panel PN10 to the SNS server 200.

Then, as illustrated in FIG. 17(b), it is assumed that a web page W12 including the share panel PN10 is displayed on the terminal apparatus 10 of the user who is a friend of the user who has posted the share panel PN10. Then, it is assumed that, when the share panel PN10 is pressed in the web page W12, a web page W11 is displayed, as illustrated in FIG. 17(c). In this case, the miShare buttons B22 to B14 corresponding to the "development", the "turn", and the "conclusion" other than the "introduction" inserted into the share panel PN10, which is a transition source, are displayed in the web page W11 illustrated in FIG. 17(c).

In the example illustrated in FIG. 17(c), it is assumed that, when the miShare button B22 is pressed, the generation unit 133 of the information providing apparatus 100 generates a share panel PN11. In this case, the generation unit 133 acquires the panel ID of the share panel PN10, which is the transition source of the web page W11, from the terminal apparatus 10. In addition, the generation unit 133 inserts information indicating the "development" among the introduction, the development, the turn, and the conclusion into the share panel PN11. Then, the transmitting unit 134 transmits the share panel PN11 and the panel ID of the share panel PN10 to the SNS server 200. In this case, similarly to the example illustrated in FIG. 16, the storage unit 233 of the SNS server 200 stores the share panel PN11 in the share panel storage unit 223 and stores the panel ID of the share panel PN10 and the panel ID of the share panel PN11 in a predetermined storage unit so that the panel IDs are associated with each other.

In this way, the information providing apparatus 100 allows a plurality of users to post the share panels corresponding to introduction, development, turn, and conclusion as the share panels of the web page W11. Then, when receiving a share panel acquisition request from the terminal apparatus 10 of the user who is a friend of all users who have posted each share panel, the information providing apparatus 100 distributes the share panels corresponding to introduction, development, turn, and conclusion to the terminal apparatus 10. Then, the terminal apparatus 10 displays the share panels corresponding to introduction, development, turn, and conclusion in the web page. In this case, the terminal apparatus 10 may display the share panels corresponding to "introduction", "development", "turn", and "conclusion" in this order from the upper side of a sharing advertisement frame C13, or it may display the share panels in the same sharing advertisement frame C13 in the order of "introduction", "development", "turn", and "conclusion" while changing the share panels at a predetermined time interval.

In this way, the information providing apparatus 100 can display a plurality of share panels with stories on the terminal apparatus 10. In the example illustrated in FIG. 17, the information providing apparatus 100 can generate a share panel such as a four-frame comic strip. Therefore, it is possible to improve the power to appeal to the user who browses the share panel.

7-7. Template

In the above-described embodiment, the template of the share panel stored in the information providing apparatus 100 is not limited to that illustrated in the drawings. For example, the information providing apparatus 100 may store a template in which a newscaster or a desk (news desk) used by the newscaster is drawn as the template having the image of a news program. In this case, the generation unit 133 incorporates the photograph image into, for example, a part (image frame PA3) of the face of the newscaster. In addition, the information providing apparatus 100 may store the templates related to tourist spots or specialties. For example, the information providing apparatus 100 may store a template including the image of Mount Fuji.

As described in the example illustrated in FIG. 14, the generation unit 133 of the information providing apparatus 100 may allow the user to select the template used to generate the share panel among the templates related to the attributes of the web page, which is the link destination of the share panel. For example, when generating a share panel for the web page of a news article, such as economy, the generation unit 133 inserts the template including the image of the news desk into a template selection screen W21. When generating a share panel for the web page related to a tourist spot or a specialty, the generation unit 133 inserts the template including the image of the tourist spot or the specialty into a template selection screen W21.

The generation unit 133 may change the template included in the template selection screen W21 depending on the time when the share panel is generated. For example, when the share panel is generated in the morning (for example, six o'clock to nine o'clock), the generation unit 133 inserts the template that conjures up a fresh image into the template selection screen W21.

When the terminal apparatus 10 is a mobile terminal, the generation unit 133 may acquire positional information indicating the current position from the terminal apparatus 10 and change the template included in the template selection screen W21 depending on the acquired positional information. For example, when the terminal apparatus 10 is located in the vicinity of a tourist spot during the generation of the share panel, the generation unit 133 inserts the template related to the tourist spot into the template selection screen W21.

In the above-described embodiment, the generation unit 133 allows the user to input share panel information in the order of FIGS. 5(b), 5(c), and 5(d), but the invention is not limited thereto. For example, the generation unit 133 may allow the user to input comments to the comment input screen W22 and then allow the user to select the template on the template selection screen W21. In this case, the generation unit 133 may change the template included in the template selection screen W21 depending on the comments input to the comment input screen W22. For example, the generation unit 133 may perform morphological analysis for the comments. When the input comments include words indicating emotions (for example, "joy" and "sorrow"), the generation unit 133 may insert the template corresponding to the emotions into the template selection screen W21. In addition, the generation unit 133 may process the photograph image selected from the share image selection screen W23 into a photograph corresponding to the emotions. For example, when the comments include the word "sorrow", the generation unit 133 may overlap the image of a tear on the eye of the user who is drawn in the photograph image.

For example, the generation unit 133 may allow the user to select the photograph image from the share image selection screen W23 and then allow the user to select the template from the template selection screen W21. In this case, the generation unit 133 may change the template included in the template selection screen W21 based on the photograph image selected from the share image selection screen W23. For example, the generation unit 133 may analyze the photograph image to estimate the emotions of the user drawn in the photograph image and insert the template corresponding to the estimated emotions into the template selection screen W21. In addition, the generation unit 133 may process the photograph image selected from the share image selection screen W23 into a photograph corresponding to the estimated emotions.

The information providing apparatus 100 may store the number of times the template is selected by the user or the frequency of the selection for each template. In this case, the generation unit 133 may preferentially insert the template which is frequently selected by the user among the templates stored in the template storage unit 122 into the template selection screen W21. In this way, the information providing apparatus 100 can provide a popular template to the user.

The information providing apparatus 100 may store combinations of the templates and the photograph images which were selected by each user in the past as history information for each user. Then, the generation unit 133 may preferentially insert the template which has been frequently selected together with the photograph image selected from the share image selection screen W23 among the templates stored in the template storage unit 122 into the template selection screen W21. In addition, when the photograph image is selected after the template is selected, the generation unit 133 may preferentially insert the photograph image which has been frequently selected together with the selected template into the share image selection screen W23.

In the above-described embodiment, the information providing apparatus 100 may store the click rate of each share panel (the ratio of the number of clicks to the number of times the share panel is displayed) or the number of clicks as history information for each share panel. Alternatively, the information providing apparatus 100 may display the share panel together with an evaluation button for evaluating the share panel in the web page and store the evaluation value of each share panel for each share panel. Then, the generation unit 133 may preferentially insert the template used for a share panel with a high click rate, the template used for a share panel which is frequently clicked, or the template used for a share panel with a large evaluation value among the templates stored in the template storage unit 122 into the template selection screen W21. In this way, the generation unit 133 can generate a share panel which is likely to be clicked.

The information providing apparatus 100 may store the click rate (or the number of clicks) or the evaluation value of the share panel as the history information for each web page (that is, the web page to be advertised), which is the link destination of the share panel. Then, when generating a new share panel to be linked to a predetermined web page, the generation unit 133 may preferentially insert the template used for a share panel with a high click rate (or which is frequently clicked) or a large evaluation value among the generated share panels to be linked to the web page into the template selection screen W21. The invention is not limited to this example. For example, the information providing apparatus 100 may store the click rate (or the number of clicks) or the evaluation value of the share panel as the history information for each attribute of the web page, which is the link destination of the share panel. The "attributes of the web page" are classified into, for example, a news site, a finance site, a weather site, and a shopping site. The "attributes of the web page" may be classified in more detail. For example, the attributes of the web page correspond to the attributes of the articles inserted into the web page (for example, politics, sports, and entertainment) or the attributes of products inserted into the web page (for example, appliances and foodstuffs). Then, when generating a new share panel to be linked to a predetermined web page, the generation unit 133 may preferentially insert the template used for a share panel with a high click rate (or which is frequently clicked) or a large evaluation value among the generated share panels to be linked to a web page with attributes identical to the attributes of the predetermined web page into the template selection screen W21. Therefore, the generation unit 133 can recommend the user the template which has high compatibility with the web page, which is the link destination of the share panel, and is likely to be clicked. As a result, the generation unit 133 can generate the share panel which is likely to be clicked.

7-8. Share Panel to be Displayed

In the above-described embodiment, the SNS server 200 may store the click rate (or the number of clicks) of each share panel as the history information for each share panel. In addition, when the evaluation button for evaluating the share panel is displayed as described above, the SNS server 200 may store the evaluation value of each evaluation value for each share panel. Then, when a share panel acquisition request is received from the terminal apparatus 10, the distribution unit 234 of the SNS server 200 may preferentially distribute a share panel with a high click rate (or which is frequently clicked) or a share panel with a large evaluation value among the share panels posted by the user who is a friend of the user of the terminal apparatus 10 to the terminal apparatus 10. That is, when there are a plurality of share panels to be linked to the same web page, the distribution unit 234 may preferentially distribute the share panel with a high click rate or a large evaluation value to the terminal apparatus 10. In this case, the click rate or the evaluation is likely to be greatly changed depending on the user who generates the share panel even in the same web page, which is a link destination. Therefore, the SNS server 200 can distribute the share panel which is more likely to be clicked to the terminal apparatus 10.

Contrary to the above-mentioned example, when there are a plurality of share panels to be linked to the same web page, the distribution unit 234 may preferentially distribute the share panel with a low click rate or a small evaluation value to the terminal apparatus 10. The reason is as follows. When the share panel has a low click rate or a small evaluation value, but is generated by the friend, it is more likely to be clicked than general advertising content. That is, the information providing apparatus 100 according to the embodiment allows the user to browse the share panel generated by the friend. Therefore, even when the share panel with a low click rate or a small evaluation value is preferentially displayed, it is possible to improve the click rate. In addition, when the click rate or evaluation value of a web page, which is a link destination, is less than the click rate or evaluation value of another web page, which is a link destination, the distribution unit 234 may preferentially distribute the share panel linked to the web page, which is a link destination, to the terminal apparatus 10. The reason is as follows. When the share panel has a low click rate or a small evaluation value, but the share panel is generated by the friend, it is likely to be clicked.

7-9. Others

In the above-described embodiment, the share panel is displayed in the sharing advertisement frame C13 of the web page. However, when there is no advertising content to be displayed in the general advertisement frame C12, the share panel may be displayed in the general advertisement frame C12.

In the above-described embodiment, the photograph image incorporated into the share panel is not limited to the tagged photograph image. For example, the photograph image which is posted to the SNS server 200 by the user who generates the share panel or a fiend of the user may be incorporated into the share panel.

In the above-described embodiment, the information providing apparatus 100 generates the share panel of the web page which is provided by the information providing apparatus 100. However, the information providing apparatus 100 may generate the share panel of the web page which is generated by an apparatus (for example, the advertiser apparatus 300) other than the information providing apparatus 100. For example, the apparatus of the advertiser apparatus 300 distributes the web page including the miShare button B10 which is linked to the information providing apparatus 100 to the terminal apparatus 10. When the user presses the miShare button B10, the terminal apparatus 10 accesses the information providing apparatus 100 and generates the share panel as in the example illustrated in FIG. 5.

In the above-described embodiment, the share panel is the link information to the web page. However, the share panel may be link information to content other than the web page. For example, the share panel may be link information to a still image, a moving image, or music data.

Among the processes according to the above-described embodiment, some or all of the processes which are automatically performed may be manually performed, or some or all of the processes which are manually performed may be automatically performed by a known method. In addition, information including the procedure, the detailed names, and various kinds of data or parameters described in the above-mentioned document or drawings can be arbitrarily changed except in a case in which it is specified.

The drawings are conceptual diagrams illustrating the functions of each component of each apparatus, and the components are not necessarily physically configured as illustrated in the drawings. That is, the detailed form of the dispersion and integration of each apparatus is not limited to that illustrated in the drawings, but some or all of the apparatuses may be functionally and physically dispersed and integrated in an arbitrary unit, depending on various loads or usage conditions.

For example, in the above-described embodiment, the information providing apparatus 100 and the SNS server 200 may be the same apparatus. That is, the information providing apparatus 100 may be a server apparatus which distributes the web pages and provides the social networking service. In this case, the information providing apparatus 100 illustrated in FIG. 3 does not need to include the transmitting unit 134 and includes the same processing units as the storage unit 220 and the control unit 230 illustrated in FIG. 6.

8. Advantages

As described above, the information providing apparatus 100 according to the embodiment includes the receiving unit 131 and the distribution unit 132. The receiving unit 131 receives an access request for accessing a web page (corresponding to an example of first content) from the terminal apparatus 10 used by the first user. When the receiving unit 131 receives the access request, the distribution unit 132 distributes, to the terminal apparatus 10, a web page including the share panel (corresponding to an example of link information) posted by the second user related to the first user in a predetermined social networking service (corresponding to an example of a communication service) among the share panels linked to another web page (corresponding to an example of another content).

Therefore, the information providing apparatus 100 according to the embodiment can distribute the share panel which is likely to be clicked by the user as advertisements. Specifically, the information providing apparatus 100 displays the share panel processed by the friend in the web page, which makes it possible to distribute advertisements with high customer appeal.

In the network system 1 according to the embodiment, when the user needs to log in the SNS server 200 in order to generate the share panel, it is possible to increase the number of members of the SNS server 200. In the network system 1 according to the embodiment, since the tagged photograph image is inserted into the share panel, it is possible to facilitate the tagging of the user to tag the photograph image. That is, in the network system 1 according to the embodiment, it is possible to improve the rate of utilization of the SNS server 200.

In the information providing apparatus 100 according to the embodiment, the distribution unit 132 distributes the web page in which the share panel including user information (for example, the tagged photograph image) for identifying the second user is displayed.

Therefore, the information providing apparatus 100 according to the embodiment enables the user who browses the share panel to recognize the user who has posted the share panel. As a result, it is possible to improve the possibility that the share panel will be clicked.

In the information providing apparatus 100 according to the embodiment, the generation unit 133 generates a share panel including information (for example, a title) indicating a predetermined web page or user information (for example, the tagged photograph image) for identifying the first user as the share panel to be linked to the predetermined web page, in response to the operation of the first user of the terminal apparatus 10 which has received the predetermined web page.

Therefore, the information providing apparatus 100 according to the embodiment can generate the share panel in which the outline of the web page is displayed. As a result, it is possible to improve the possibility that the share panel will be clicked.

In the information providing apparatus 100 according to the embodiment, the transmitting unit 134 transmits the share panel generated by the generation unit 133 to the SNS server 200. The distribution unit 132 distributes the web page in which the share panel distributed from the SNS server 200 which has received the share panel transmitted from the transmitting unit 134 is displayed.

Therefore, the information providing apparatus 100 according to the embodiment enables the user who browses the web page to post the share panel of the web page to the SNS server 200.

The structure of the information providing apparatus 100 and the SNS server 200 can be flexibly changed. For example, the information providing apparatus 100 and the SNS server 200 may be implemented by a plurality of server computers. In addition, for example, an external platform may be called by an application programming interface (API) or network computing depending on functions to implement the information providing apparatus 100 and the SNS server 200.

In the claims, a "unit" can be replaced with a "section", a "module", or a "circuit". For example, a receiving unit can be replaced with a receiving module or a receiving circuit.

According to an aspect of the embodiment, it is possible to distribute advertisements with high customer appeal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing apparatus for use with a first user, and a second user, a third user having a predetermined relationship with each other, the information providing apparatus comprising:
a memory;
a processor coupled to the memory, the processor being programmed to:
receive an access request for accessing a first web page from a first terminal apparatus used by the first user;
distribute the first web page to the first terminal apparatus when the access request for accessing the first web page is received from the first terminal apparatus, the distributed first web page including a first article display frame and at least one first advertisement frame;
in response to a request for sharing a first article displayed in the first display frame from the first terminal apparatus, generate a first share panel, the generated first share panel being a link image linked to the first web page, and including comments input by the first user;
receive an access request for accessing a second web page from a second terminal apparatus used by the second user, the first and second users being related to each other in a predetermined communication service;
distribute the second web page to the second terminal apparatus when the access request for accessing the second web page is received from the second terminal apparatus, the distributed second web page including a second article display frame and at least one second advertisement frame in which the generated first share panel is displayed;
receive an access request for accessing the first web page from the second terminal apparatus when the second user clicks the first share panel displayed in the at least one second advertisement frame;
distribute the first web page to the second terminal apparatus, when the access request for accessing the first web page is received from the second terminal apparatus;
in response to a request for sharing the first article displayed in the first display frame from the second terminal apparatus used by the second user who has clicked the first stare panel, generate a second share panel, the generated second share panel: (i) being associated with the first share panel, (ii) being a link image linked to the first web page, and (iii) including comments input by the second user;
receive an access request for accessing a third web page from a third user terminal apparatus used by the third user, the first, second and third users being related to each other in the predetermined communication service; and
display, in at least two advertisement frames included in the third web page, the generated first share panel and the generated second share panel associated with the first share panel respectively.

2. The information providing apparatus according to claim 1, wherein the processor distributes the second web page including the first share panel in which first user information for identifying the first user is included to the second terminal apparatus.

3. The information providing apparatus according to claim 2, wherein the processor distributes the second web page including the first share panel in which a user image associated with the first user is included as the first user information to the second terminal apparatus.

4. The information providing apparatus according to claim 1, wherein the processor is programmed to:
generate the second share panel to include second user information for identifying the second user in the second share panel, in response to an operation of the second user of the second terminal apparatus receiving the first web page.

5. The information providing apparatus according to claim 4, wherein the processor is programmed to:
transmit the generated second share panel to a service providing apparatus which provides the communication service, wherein
the processor distributes content including the transmitted second share panel distributed from the service providing apparatus.

6. The information providing apparatus according to claim 4, wherein the processor is programmed to:
store a plurality of templates for generating the second share panel, wherein
the processor generates the second share panel based on a template selected by the second user among the stored templates.

7. The information providing apparatus according to claim 6, wherein the processor allows the second user to select the template which has been frequently selected by the second user among the stored templates, on the basis of history information about the template which was selected in the past by the second user.

8. The information providing apparatus according to claim 6, wherein
the processor stores attributes of an advertiser who advertises a product or a service and a template including information about the product or the service for each advertiser so as to be associated with each other, and
the processor allows the second user to select a template used to generate the second share panel from templates corresponding to attributes of the first web page among the stored templates.

9. The information providing apparatus according to claim 4, wherein
the processor associates pieces of second share panel to the first web page, and
the processor distributes content including pieces of generated second share panel which are associated with each other.

10. The information providing apparatus according to claim 1, wherein the first share panel is displayed to the second user only if the first user purchases at least one product associated with the first share panel.

11. The information providing apparatus according to claim 1, wherein the first share panel corresponds to an "introduction," "development," "turn," or "conclusion," of a story, which is displayed in a specific order and in a predetermined time interval within a plurality of share panels.

12. An information providing method performed by an information providing apparatus for use with a first user, a second user, and a third user having a predetermined relationship with each other, the information providing method comprising:
receiving an access request for accessing a first web page from a first terminal apparatus used by the first user;
distributing the first web page to the first terminal apparatus when the access request for accessing the first web page is received from the first terminal apparatus, the distributed first web page including a first article display frame and at least one first advertisement frame;
in response to a request for sharing a first article displayed in the first display frame from the first terminal apparatus, generating a first share panel, the generated first share panel being a link image linked to the first web page, and including comments input by the first user;
receiving an access request for accessing second web page from a second terminal apparatus used by the second user, the first and second users being related to each other in a predetermined communication service;
distributing the second web page to the second terminal apparatus when the access request for accessing the second web page is received from the second terminal apparatus, the second web page including a second article display frame and at least one second advertisement frame in which the generated first share panel is displayed;
receiving an access request for accessing the first web page from the second terminal apparatus when the second user clicks the first share panel displayed in the at least one second advertisement frame;
distributing the first web page to the second terminal apparatus, when the access request for accessing the first web page is received from the second terminal apparatus;
in response to a request for sharing the first article displayed in the first display frame from the second terminal apparatus used by the second user who has clicked the first share panel, generating a second share panel, the generated second share panel being associated with the first share panel, being a link image linked to the first web page, and including comments input by the second user;
receiving an access request for accessing a third web page from a third user terminal apparatus used by the third user, the first, second and third users being related to each other in the predetermined communication service: and
displaying, in at least two advertisement frames included in the third web page, the generated first share panel and the generated second share panel associated with the first share panel respectively.

13. The information providing method according to claim 12, wherein the distribution of second web page to the second terminal apparatus includes first share panel in which user information for identifying the first user is included.

14. The information providing method according to claim 13, wherein the distribution of second web page includes the first share panel in which a user image associated with theme first user is included as the user information to the second terminal apparatus.

15. A non-transitory computer-readable storage medium with an executable program stored thereon for use with a first user, a second user, and a third user having a predetermined relationship with each other, the program instructing a computer to perform steps comprising:
receiving an access request for accessing first web page from a first terminal apparatus used by the first user;
distributing the first web page to the first terminal apparatus when the access request for accessing the first web page is received from the first terminal apparatus, the distributed first web page including a first article display frame and at least one first advertisement frame;
in response to a request for sharing a first article displayed in the first display frame from the first terminal apparatus, generating a first panel, the generated first panel being a link image linked to the first web page, and including comments input by the first user;
receiving an access request for accessing a second web page from a second terminal apparatus used by the second user, the first and second users being related to each other in a predetermined communication service;
distributing the second web page to the second terminal apparatus when the access request for accessing the second web page is received from the second terminal apparatus, the second web page including a second article display frame and at least one second advertisement frame in which the generated first share panel is displayed;
receiving an access request for accessing the first web page from the second terminal apparatus when the second user clicks the first share panel displayed in the at least one second advertisement frame;
distributing the first web page to the second terminal apparatus, when the access request for accessing the first web page is received from the second terminal apparatus;
in response to a request for sharing the first article displayed in the first display frame from the second terminal apparatus used by the second user who has clicked the first share panel, generating a second share panel, the generated second share panel being associated with the first share panel, being a link image linked to the first web page and including comments input by the second user;
receive an access request for accessing a third web page from a third user terminal apparatus used by the third user, the first, second and third users being related to each other in the predetermined communication service; and
display, in at least two advertisement frames included in the third web page, the generated first share panel and the generated second share panel associated with the first share panel respectively.

16. The non-transitory computer-readable storage medium according to claim 15, wherein the distributing step includes distributing the second web page including the first share panel in which user information for identifying the first user is included to the second terminal apparatus.

17. The non-transitory computer-readable storage medium according to claim 16, wherein the distributing step includes distributing the second web page including the first share panel in which a user image associated with the first user is included as the user information to the second terminal apparatus.

18. A network system for use with a first user and a second user having a predetermined relationship with each other, the network system comprising:
a service providing apparatus; and
an information providing apparatus including:
a processor programmed to:
receive an access request for accessing first web page from a first terminal apparatus used by the first user;
distribute the first web page to the first terminal apparatus when the access request for accessing the first web page is received from the first terminal apparatus, the distributed first web page including a first article display frame and at least one first advertisement frame;
in response to a request for sharing a first article displayed in the first display frame from the first terminal apparatus, generate first share pane, the generated first share panel being a link image linked to the first web page, and including comments input by the first user;
receive an access request for accessing second web page from a second terminal apparatus used by the second user, the first and second users being related to each other in a predetermined communication service;
distribute the second web page to the second terminal apparatus when the access request for accessing the second web page is received from the second terminal apparatus, the second web page including a second article display frame and at least one second advertisement frame in which the generated first share panel is displayed;
receive an access request for accessing the first web page from the second terminal apparatus when the second user clicks the first share panel displayed in the at least one second advertisement frame;
distribute the first web page to the second terminal apparatus, when the access request for accessing the first web page is received from the second terminal apparatus;
in response to a request for sharing the first article displayed in the first display frame from the second terminal apparatus used by the second user who has clicked the first share panel, generate a second share panel, the generated second share panel being associated with the first share panel, being a link image linked to the first web page, including comments input by the second user;
transmit the generated second share panel to the service providing apparatus, and
the service providing apparatus includes:
a storage unit configured to store the second share panel and information for identifying the second user so as to be associated with each other; and
a processor programmed to:
receive an access request for accessing a third web page from a third user terminal apparatus used by the third user, the first, second and third users being related to each other in the predetermined communication service; and
display, in at least two advertisement frames included in the third web page, the generated first share panel and the generated second share panel associated with the first share panel respectively.

19. The network system according to claim 18, wherein distribution of arbitrary content includes the first share panel in which user information for identifying the first user is included to the second terminal apparatus.

20. The network system according to claim 19, wherein the distribution of the arbitrary content includes the first share panel in which a user image associated with the first user is included as the user information to the second terminal apparatus.

* * * * *